USO10225015B2

United States Patent
Oshima et al.

(10) Patent No.: US 10,225,015 B2
(45) Date of Patent: Mar. 5, 2019

(54) VISIBLE LIGHT COMMUNICATION METHOD, IDENTIFICATION SIGNAL, AND RECEIVER

(71) Applicant: PANASONIC INTELLECTUAL PROPERTY CORPORATION OF AMERICA, Torrance, CA (US)

(72) Inventors: Mitsuaki Oshima, Kyoto (JP); Koji Nakanishi, Kanagawa (JP); Hideki Aoyama, Osaka (JP); Shigehiro Iida, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/652,848

(22) Filed: Jul. 18, 2017

(65) Prior Publication Data

US 2017/0317749 A1 Nov. 2, 2017

Related U.S. Application Data

(63) Continuation of application No. 15/007,689, filed on Jan. 27, 2016, now Pat. No. 9,742,494, which is a
(Continued)

(51) Int. Cl.
*H04B 10/00* (2013.01)
*H04B 10/116* (2013.01)

(52) U.S. Cl.
CPC .................. *H04B 10/116* (2013.01)

(58) Field of Classification Search
USPC ....................................................... 398/172
See application file for complete search history.

(56) References Cited

U.S. PATENT DOCUMENTS 6,865,347 B2 * 3/2005 Perkins ..................... G01S 1/70
                                                                398/130
7,006,768 B1 * 2/2006 Franklin ............. H04B 10/1149
                                                                398/115
(Continued)

FOREIGN PATENT DOCUMENTS

JP     2002-290335      10/2002
JP     2007-086241       4/2007
(Continued)

OTHER PUBLICATIONS

International Search Report, dated May 27, 2014, for corresponding International Application No. PCT/JP2014/001524.
(Continued)

*Primary Examiner* — Agustin Bello
(74) *Attorney, Agent, or Firm* — Greenblum & Bernstein, P.L.C.

(57) ABSTRACT

A visible light communication method is provided that includes obtaining a first information, by a receiver, through visible light communication with a light source. The method also includes sending the first information and a second information, by the receiver, to a first server, the second information related to a membership information of a specified organization which is stored in the receiver. The method further includes obtaining, by the receiver, information from the first server using the first information and the second information.

8 Claims, 45 Drawing Sheets

Related U.S. Application Data continuation of application No. 14/219,116, filed on Mar. 19, 2014, now Pat. No. 9,287,977.

(60) Provisional application No. 61/921,131, filed on Dec. 27, 2013.

(56) References Cited

U.S. PATENT DOCUMENTS

| | | | | |
|---|---|---|---|---|
| 7,352,972 B2* | 4/2008 | Franklin | ............ | H04B 10/1141 398/127 |
| 7,439,847 B2* | 10/2008 | Pederson | ............ | G07C 9/00158 340/5.81 |
| 7,970,537 B2* | 6/2011 | Ann | ............ | G01C 21/20 398/172 |
| 8,019,227 B2* | 9/2011 | Iizuka | ............ | H04B 10/116 382/103 |
| 8,334,901 B1 | 12/2012 | Ganick et al. | | |
| 8,428,469 B2* | 4/2013 | Kim | ............ | H04B 10/116 398/127 |
| 8,457,502 B2* | 6/2013 | Ryan | ............ | G01S 1/70 398/172 |
| 8,565,612 B2* | 10/2013 | Kim | ............ | H04B 10/116 398/127 |
| 8,593,299 B2* | 11/2013 | Pederson | ............ | H04B 10/1143 340/815.45 |
| 8,886,045 B2* | 11/2014 | Pederson | ............ | H04B 10/1143 315/312 |
| 9,008,519 B2* | 4/2015 | Park | ............ | H04B 10/1149 398/118 |
| 9,014,564 B2* | 4/2015 | Roberts | ............ | H04B 10/116 382/280 |
| 9,258,864 B2* | 2/2016 | Pederson | ............ | H04B 10/1143 |
| 9,414,458 B2* | 8/2016 | Pederson | ............ | H05B 33/0863 |
| 9,655,189 B2* | 5/2017 | Pederson | ............ | H05B 33/0845 |
| 9,681,468 B2* | 6/2017 | Lee | ............ | H04W 4/70 |
| 2002/0167701 A1* | 11/2002 | Hirata | ............ | H04B 10/1141 398/121 |
| 2009/0157309 A1* | 6/2009 | Won | ............ | G01C 21/20 701/533 |
| 2010/0067919 A1* | 3/2010 | Ono | ............ | H04B 10/116 398/172 |
| 2010/0215378 A1* | 8/2010 | Rajagopal | ............ | H04B 10/1149 398/158 |
| 2011/0064405 A1* | 3/2011 | Rajagopal | ............ | H04B 10/114 398/43 |
| 2011/0091220 A1* | 4/2011 | Rajagopal | ............ | H04B 10/1149 398/172 |
| 2011/0313660 A1* | 12/2011 | Won | ............ | G01C 21/20 701/420 |
| 2012/0089325 A1* | 4/2012 | Won | ............ | G01C 21/20 701/410 |
| 2012/0106977 A1* | 5/2012 | Ma | ............ | H04B 10/116 398/172 |
| 2012/0140040 A1* | 6/2012 | Sakurai | ............ | G06T 19/006 348/46 |
| 2013/0028612 A1* | 1/2013 | Ryan | ............ | G01S 1/70 398/172 |
| 2013/0163994 A1* | 6/2013 | Iizuka | ............ | H04B 10/116 398/130 |
| 2013/0330088 A1* | 12/2013 | Oshima | ............ | H04B 10/11 398/130 |
| 2013/0335592 A1* | 12/2013 | Yamada | ............ | H04B 10/11 348/229.1 |
| 2013/0337787 A1* | 12/2013 | Yamada | ............ | H04B 10/11 455/414.1 |
| 2014/0037296 A1* | 2/2014 | Yamada | ............ | H04B 10/11 398/128 |
| 2014/0086587 A1* | 3/2014 | Roberts | ............ | H04B 10/116 398/115 |
| 2014/0193162 A1* | 7/2014 | Iizuka | ............ | H04B 10/1129 398/172 |
| 2014/0286644 A1* | 9/2014 | Oshima | ............ | H04B 10/11 398/118 |
| 2014/0290138 A1* | 10/2014 | Oshima | ............ | H04B 10/11 49/25 |
| 2015/0147067 A1* | 5/2015 | Ryan | ............ | H04B 10/116 398/118 |
| 2015/0188629 A1* | 7/2015 | Oshima | ............ | H04B 10/116 398/118 |
| 2016/0142140 A1* | 5/2016 | Oshima | ............ | H04B 10/116 398/130 |
| 2016/0191155 A1* | 6/2016 | Oshima | ............ | H04B 10/11 398/118 |
| 2016/0197675 A1* | 7/2016 | Ganick | ............ | H04N 5/2256 398/172 |
| 2016/0352421 A1* | 12/2016 | Oshima | ............ | H04B 10/11 |
| 2017/0099102 A1* | 4/2017 | Oshima | ............ | H04B 10/11 |
| 2017/0141848 A1* | 5/2017 | Daoud | ............ | H04W 4/029 |
| 2017/0230118 A1* | 8/2017 | Shatz | ............ | H04B 10/541 |
| 2017/0317749 A1* | 11/2017 | Oshima | ............ | H04B 10/116 |

FOREIGN PATENT DOCUMENTS

| | | |
|---|---|---|
| JP | 2009-206620 | 9/2009 |
| JP | 2009-288173 | 12/2009 |
| JP | 2012-123546 | 6/2012 |
| JP | 2013-135452 | 7/2013 |
| WO | 2013/175804 | 11/2013 |

OTHER PUBLICATIONS

Extended European Search Report, dated Nov. 30, 2016 by the European Patent Office (EPO), for the corresponding European Patent Application No. 14874704.1.

Office Action, dated Jun. 28, 2018, from the European Patent Office (EPO) for the corresponding European Patent Application No. 14874704.1.

* cited by examiner

FIG. 4

| Area ID | GPS | Wireless LAN access point identifier | Store information |
|---|---|---|---|
| 1A1 | Latitude 34.704788 Longitude 135.496933 | 001038123455 | XX Shop Store No.: 121433 |
| 1A2 | Latitude 34.699848 Longitude 135.498306 | 003267234511 | XX Building Store No.: 141436 |
| 1A3 | Latitude 34.699496 Longitude 135.495666 | 000124567214 | YY Department Store Store No.: 201639 |
| ⋮ | | ⋮ | |

B1901 — Area ID
B1902 — GPS
B1903 — Wireless LAN access point identifier
B1904 — Store information

FIG. 9

| Inquiry ID (B1801) | ID correspondence information (B1802) |
|---|---|
| A1B2D1F1 | http://example.com/indexA.html |
| A1B2D1F2 | http://example.com/indexB.html |
| A1B2D1F3 | http://example.com/indexC.html |
| A1B2D1F4 | http://example.com/indexD.html |
| A1B2D1F5 | http://example.com/infoA.html |
| A1B2D1F6 | http://example.com/infoC.html |
| : | : |

FIG. 13

| Attribute name | Attribute value |
|---|---|
| Name | Matsushita Taro |
| Sex | Male |
| Address | 4 – 1 XX town, Osaka city, Osaka |
| Membership rank | Premium |
| Age | 35 years old |
| Last purchase date | 2013/10/1 |
| ⋮ | ⋮ |

B1601 — Attribute name
B1602 — Attribute value
B1603
B1604
B1605

FIG. 14

| Interpolation ID | User attribute |
|---|---|
| 1B0 | Default interpolation ID (used when the following interpolation IDs do not apply) |
| 1B1 | Sex: Male, Membership rank: Premium, Age: 30 to 39 |
| 1B2 | Sex: Female, Age: 40 to 45 |
| 1B3 | Last purchase date: before 2013/6/1 |
| : | : |

B1701 — Interpolation ID
B1702 — User attribute

FIG. 19

| Interpolation ID | Light receiving camera | Degree R of mobile terminal | Location of visible light transmitter |
|---|---|---|---|
| 1C1 | Front camera | 315 degs ≤ R ≤ 360 degs or 0 deg ≤ R < 45 degs | Wall behind user |
| 1C2 | Front camera | 45 degs ≤ R < 135 degs | Ceiling |
| 1C3 | Front camera | 135 degs ≤ R < 225 degs | Wall in front of user |
| 1C4 | Front camera | 225 degs ≤ R < 315 degs | Floor |
| 1C3 | Back camera | 315 degs ≤ R ≤ 360 degs or 0 deg ≤ R < 45 degs | Wall in front of user |
| 1C4 | Back camera | 45 degs ≤ R < 135 degs | Floor |
| 1C1 | Back camera | 135 degs ≤ R < 225 degs | Wall behind user |
| 1C2 | Back camera | 225 degs ≤ R < 315 degs | Ceiling |

B1504  B1501  B1502  B1503

FIG. 20
(1) User visits store
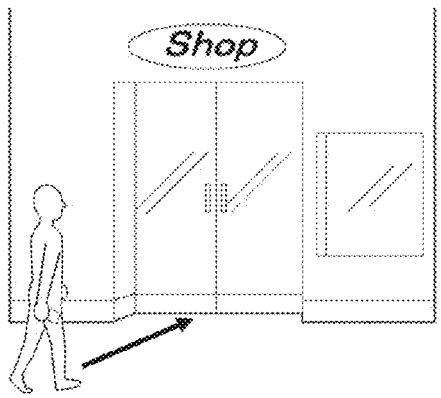
(2) Take out mobile terminal on specific sales floor in store
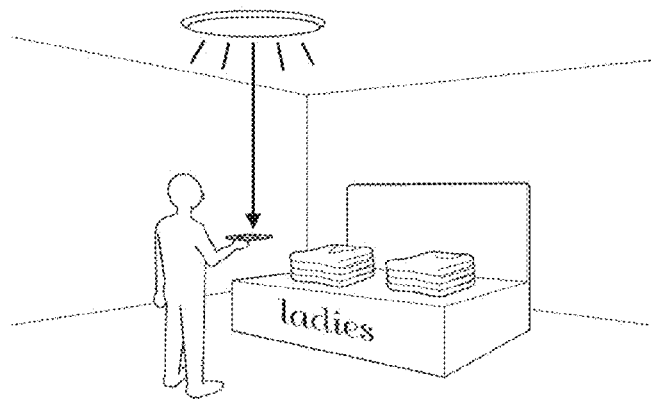
(3) Display information received from server on mobile terminal
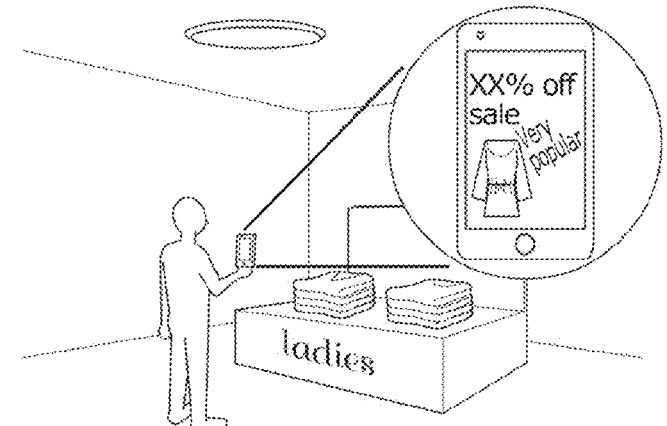

VISIBLE LIGHT COMMUNICATION METHOD, IDENTIFICATION SIGNAL, AND RECEIVER

CROSS REFERENCE TO RELATED APPLICATIONS

The application is a continuation of U.S. application Ser. No. 15/007,689 filed on Jan. 27, 2016, which is a continuation of U.S. application Ser. No. 14/219,116 filed on Mar. 19, 2014 now U.S. Pat. No. 9,287,977 Issued on Mar. 15, 2016, which claims the benefit of U.S. Provisional Patent Application No. 61/921,131 filed on Dec. 27, 2013. The entire disclosure of the above-Identified application, including the specification, drawings and claims are incorporated herein by reference in their entirety.

FIELD

The present disclosure relates to visible light communication methods.

BACKGROUND

In recent years, a home-electric-appliance cooperation function has been introduced for a home network, with which various home electric appliances are connected to a network by a home energy management system (HEMS) having a function of managing power usage for addressing an environmental issue, turning power on/off from outside a house, and the like, in addition to cooperation of AV home electric appliances by Internet protocol (IP) connection using Ethernet (registered trademark) or wireless local area network (LAN). However, there are home electric appliances whose computational performance is insufficient to have a communication function, or home electric appliances which do not have a communication function due to a matter of cost, for example.

In order to solve such a problem, Patent Literature (PTL) 1 discloses a technique of efficiently establishing communication between devices among limited optical spatial transmission devices which transmit information to free space using light, by performing communication using plural single color light sources of Illumination light.

CITATION LIST

Patent Literature

[Patent Literature 1] Japanese Unexamined Patent Application Publication No. 2002-290335

SUMMARY

Technical Problem

In such visible light communication, there is a demand for an increased communication speed. Furthermore, the capability of providing information suitable for a user is desired in such visible light communication.

Thus, a non-limiting and exemplary embodiment provides a visible light communication method in which the increased speed can be achieved or the information suitable for a user can be provided.

Solution to Problem

A visible light communication method according to an aspect of the present disclosure includes: obtaining a first ID identifying an area in which a receiver is present; obtaining a second ID by the receiver through visible light communication in the identified area; and obtaining, by the receiver, information corresponding to a third ID which is a combination of the first ID and the second ID.

It is to be noted that these general and specific aspects may be implemented using a system, a method, an integrated circuit, a computer program, or a computer-readable recording medium such as CD-ROM, or any combination of systems, methods, integrated circuits, computer programs, and recording media.

Additional benefits and advantages of the disclosed embodiments will be apparent from the Specification and Drawings. These benefits and/or advantages may be individually obtained by the various embodiments and features of the Specification and Drawings, which need not all be provided in order to obtain one or more of such benefits and/or advantages.

Advantageous Effects

The present disclosure can provide a visible light communication method in which an increased speed can be achieved or information suitable for a user can be provided.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 illustrates an example of an area ID information table held by an area ID information holding unit in Embodiment 1.

FIG. 9 illustrates an example of a correspondence information table held by an ID correspondence information holding unit in Embodiment 1.

FIG. 13 illustrates an example of user information held by a user information holding unit in Embodiment 1.

FIG. 14 illustrates an example of a user attribute correspondence table used by the interpolation ID generation unit to select the interpolation ID based on the user attribute in Embodiment 1.

FIG. 19 illustrates an example of a location correspondence table used by the interpolation ID generation unit to select the interpolation ID based on a device location in Embodiment 1.

FIG. 20 illustrates a use case in Embodiment 1.

Figure 1:
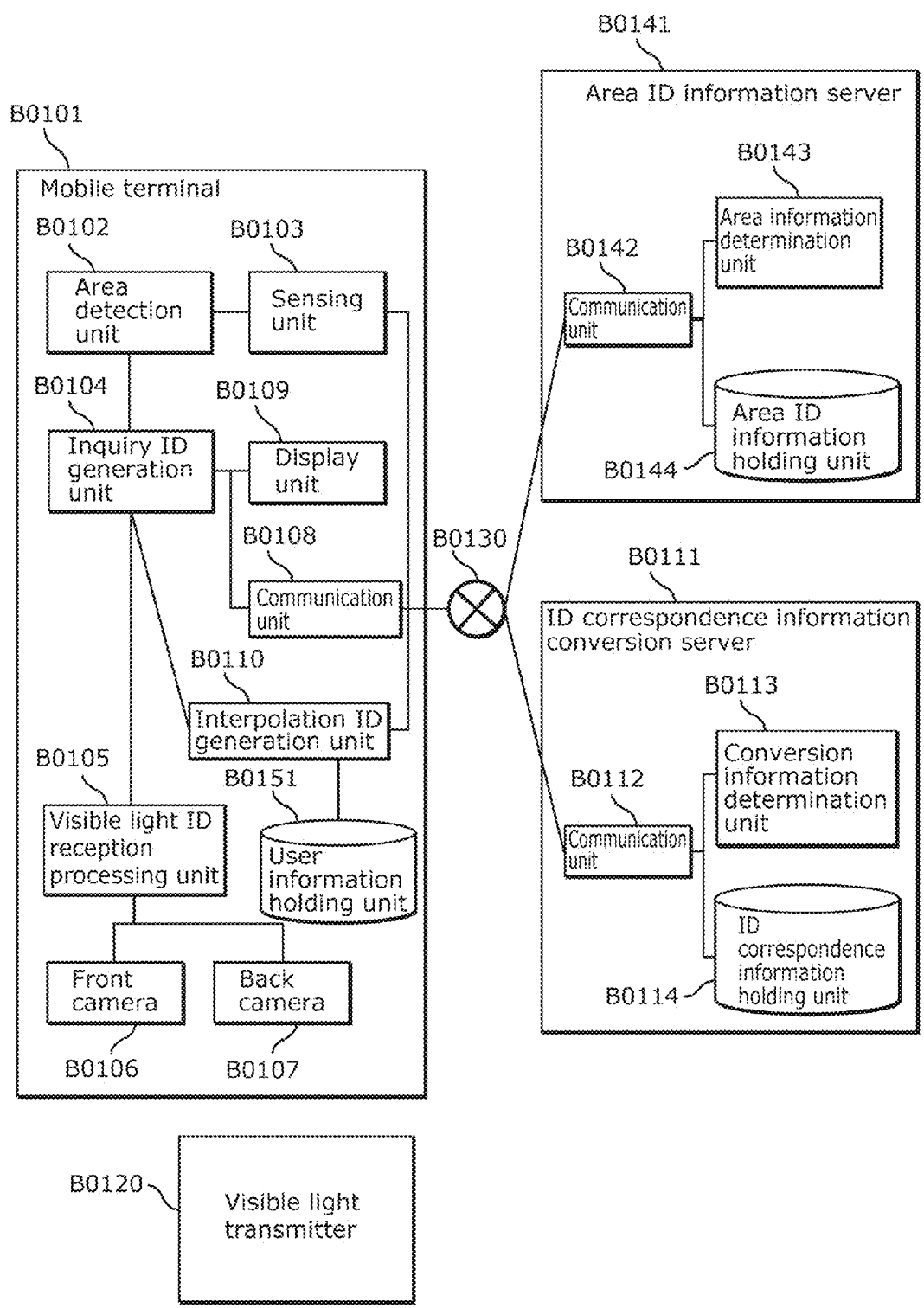
FIG. 1 is a block diagram of a visible light communication system in Embodiment 1.

DESCRIPTION OF EMBODIMENTS (Underlying Knowledge Forming Basis of the Present Disclosure)

In the visible light communication, the longer the uniquely identifiable visible light ID transmitted from the visible light transmitter is, the longer the time for the receiver to complete reception of the visible light ID is. The inventors found problems that (1) a user has to wait for a certain length of time until the reception of the visible light ID is completed and (2) the probability of failure to receive the visible light ID is high. Furthermore, the inventors found that this problem is significant especially in the case where the visible light transmitter that adopts the frequency-modulation system is used.

Thus, in the technique using the visible light communication, the ability to shorten the visible light ID is desired. Furthermore, the ability to provide information suitable for a user is desired.

The embodiments below describe a visible light communication system and a visible light communication method in which the visible light ID can be shortened and a visible light communication system and a visible light communication method in which information suitable for a user can be provided.

A visible light communication method according to an aspect of the present disclosure includes: obtaining a first ID identifying an area in which a receiver is present; obtaining a second ID by the receiver through visible light communication in the identified area; and obtaining, by the receiver, information corresponding to a third ID which is a combination of the first ID and the second ID.

Here, in the visible light communication method, the first ID which identifies an area in which the receiver is present is used as part of an ID for obtaining information. By doing so, the second ID obtained through the visible light communication can be shortened, with the result that the time to complete the visible light communication can be cut, and the probability of failure of the visible light communication can be reduced.

For example, in the obtaining of a first ID, the first ID may be obtained by referring to a table showing correspondence between the first ID and location information obtained by the receiver and indicating a location of the receiver.

For example, the location information may be information indicating the location of the receiver identified by a Global Positioning System (GPS) installed on the receiver.

For example, the location information may be information indicating a wireless LAN access point accessible by the receiver.

For example, the location information may be information obtained by the receiver and indicating a store in which the receiver is present.

Furthermore, the visible light communication method according to an aspect of the present disclosure includes: obtaining a first ID indicating an orientation of a receiver; obtaining a second ID by the receiver through visible light communication; and obtaining, by the receiver, information corresponding to a third ID which is a combination of the first ID and the second ID.

Here, in the visible light communication method, the first ID which indicates an orientation of the receiver is used as part of an ID for obtaining information. By doing so, the second ID obtained through the visible light communication can be shortened, with the result that the time to complete the visible light communication can be cut, and the probability of failure of the visible light communication can be reduced.

For example, it may be that the receiver includes a first camera and a second camera, and in the obtaining of a second ID, one of the first camera and the second camera is selected according to the orientation of the receiver and used to obtain the second ID.

Here, an appropriate camera is activated according to an orientation of the receiver, with the result that the occurrence of erroneous recognition of unintended signals and so on can be reduced.

For example, in the obtaining of a first ID, the first ID that indicates a tilt of the receiver may be obtained.

For example, in the obtaining of a first ID, the first ID may be obtained by referring to a table showing correspondence between the tilt of the receiver and the first ID.

Furthermore, the visible light communication method according to an aspect of the present disclosure includes: obtaining a first ID indicating a user attribute of a receiver; obtaining a second ID by the receiver through visible light communication; and obtaining, by the receiver, information corresponding to a third ID which is a combination of the first ID and the second ID.

Here, in the visible light communication method, the first ID which indicates an attitude of a user is used as part of an ID for obtaining information. By doing so, information suitable for the user can be provided.

For example, it may be that the visible light communication method further includes obtaining first image data by starting exposure sequentially for a plurality of exposure lines of an Image sensor each at a different time and by capturing a subject with a first exposure time so that an exposure time of each of the plurality of exposure lines partially overlaps an exposure time of an adjacent one of the plurality of exposure lines, and the obtaining of a second ID includes: obtaining second image data by starting exposure sequentially for the plurality of exposure lines each at a different time and by capturing the subject with a second exposure time shorter than the first exposure time so that an exposure time of each of the plurality of exposure lines partially overlaps an exposure time of an adjacent one of the plurality of exposure lines; and demodulating a bright line pattern that corresponds to the plurality of exposure lines and appears in the second image data, to obtain the second ID, and in the obtaining of second image data, the second exposure time is set to $1/480$ seconds or less to cause the bright line pattern to appear in the second image data.

For example, the visible light communication method may further include: performing processing of receiving a request to distribute information from a requester; distributing, as the information corresponding to the third ID, the information subject to the request from the requester; and performing information processing for charging the requester according to the distribution of the information.

An identification signal according to an aspect of the present disclosure is generated by the visible light communication method and includes the first ID and the second ID.

By doing so, the second ID obtained through the visible light communication can be shortened, with the result that the time to complete the visible light communication can be cut, and the probability of failure of the visible light communication can be reduced.

A receiver according to an aspect of the present disclosure is a receiver which receives a signal through visible light communication and includes: a first ID obtaining unit configured to obtain a first ID identifying an area in which the receiver is present; a second ID unit configured to obtain a second ID through the visible light communication in the identified area; and an information obtaining unit configured to obtain information corresponding to a third ID which is a combination of the first ID and the second ID.

Here, the receiver uses, as part of an ID for obtaining information, the first ID which identifies an area in which the receiver is present. By doing so, the second ID obtained through the visible light communication can be shortened, with the result that the time to complete the visible light communication can be cut, and the probability of failure of the visible light communication can be reduced.

A program according to an aspect of the present disclosure causes a computer to execute the visible light communication method.

It is to be noted that these general or specific aspects may be implemented using a system, a method, an integrated circuit, a computer program, or a computer-readable recording medium such as CD-ROM, or any combination of systems, methods, integrated circuits, computer programs, and recording media.

The following describes embodiments in detail with reference to the drawings as appropriate. Descriptions which are more detailed than necessary may, however, be omitted. For example, detailed descriptions on already well-known matters and overlapping descriptions on substantially the same configurations may be omitted. The reason for this is to avoid the following description becoming unnecessarily redundant, thereby helping those skilled in the art easily understand it.

It is to be noted that each of the embodiments described below shows a specific example of the present disclosure. The numerical values, shapes, materials, structural elements, the arrangement and connection of the structural elements, steps, the processing order of the steps etc., shown in the following embodiments are mere examples and do not restrict the present disclosure. Furthermore, among the structural elements in the following embodiments, structural elements not recited in the independent claims each indicating the broadest concept are described as arbitrary structural elements.

(Embodiment 1)

In this embodiment, an inquiry ID which will eventually be used is divided as an area ID uniquely set for each area and a visible light ID transmitted through the visible light communication. By doing so, it is possible to shorten the visible light ID received by a receiver through the visible light communication. Specifically, a mobile terminal identifies an area in which the mobile terminal is currently present, and obtains an area ID first that corresponds to the identified area. By doing so, when a visible light ID is received, visible light transmitters from which the visible light ID can be obtained can be narrowed down to a device intended by a user.

Furthermore, other than an explicit user operation to designate an area in which the mobile terminal is currently present, detecting a housing orientation of the mobile terminal allows automatic narrowing down of visible light transmitters from which the visible light ID can be obtained. Moreover, the housing orientation of the mobile terminal is used to determine which of a plurality of cameras in the mobile terminal is used, for example. These make it possible to know user's implicit intention.

The following describes this embodiment in detail.

FIG. 1 is a block diagram illustrating a configuration of a visible light communication system according to this embodiment. This visible light communication system includes: a mobile terminal B0101 which is a receiver; a visible light transmitter B0120; an ID correspondence information conversion server B0111; and an area ID information server B0141. The mobile terminal B0101 includes an area detection unit B0102, a sensing unit B0103, an inquiry ID generation unit B0104, a visible light ID reception unit B0105, a front camera B0106, a back camera B0107, a communication unit B0108, a display unit B0109, and a user information holding unit B0151.

The mobile terminal B0101 receives, using the front camera B0106 or the back camera B0107, visible light emitted by the visible light transmitter B0120. The visible light ID reception unit B0105 then converts the received visible light into a visible light ID.

Furthermore, the mobile terminal B0101 uses, as information for selecting a visible light ID, information on an area in which the mobile terminal B0101 held by a user is currently present. Specifically, the area detection unit B0102 detects, using sensing data obtained by the sensing unit B0103, area information related to the area in which the mobile terminal B0101 is currently present, to identify the area in which the mobile terminal B0101 is currently present.

The inquiry ID generation unit B0104 transmits the detected area information to the area ID information server B0141 in order to make an inquiry to the area ID information server B0141 via the communication unit B0108 for an ID of the area identified by the area detection unit B0102.

The area ID information server B0141 includes a communication unit B0142, an area information determination unit B0143, and an area ID information holding unit B0144.

The area ID information server B0141 receives the area information received from the mobile terminal B0101. This area information is passed to the area information determination unit B0143 via the communication unit B0142.

The area ID information holding unit B0144 holds an area ID information table showing correspondence between each area and an area ID for uniquely identifying the area.

The area information determination unit B0143 refers to the area ID information table held by the area ID information holding unit B0144, to determine an area ID that corresponds to the area information received from the mobile terminal B0101. Subsequently, the area information determination unit B0143 transmits the determined area ID to the mobile terminal B0101 via the communication unit B0142.

The inquiry ID generation unit B0104 generates an inquiry ID by combining the area ID received from the area ID Information server B0141 and the visible light ID generated by the visible light ID reception unit B0105. Subsequently, the inquiry ID generation unit B0104 requests the communication unit B0108 to obtain ID correspondence information that corresponds to the inquiry ID, with the result that the ID correspondence information that corresponds to the inquiry ID is obtained from the ID correspondence information conversion server B0111 via a public network B0130.

However, when the inquiry ID which is a combination of the area ID and the visible light ID does not satisfy a predetermined condition of the inquiry ID, the inquiry ID generation unit B0104 instructs an interpolation ID generation unit B0110 to generate an interpolation ID for interpolating the inquiry ID for shortage.

The Interpolation ID generation unit B0110 detects, using sensing data obtained by the sensing unit B0103, an orientation of the mobile terminal B0101, to generate the interpolation ID based on the result of the detection. Alternatively, the interpolation ID generation unit B0110 generates the interpolation ID based on a user attribute indicated in user information held by the user information holding unit B0151. Subsequently, an information request which includes the inquiry ID including the interpolation ID is transmitted to the ID correspondence information conversion server B0111.

The ID correspondence information conversion server B0111 includes a communication unit B0112, a conversion information determination unit B0113, and an ID correspondence information holding unit B0114.

The ID correspondence information holding unit B0114 holds a plurality of pieces of ID correspondence information which correspond to respective inquiry IDs.

When the communication unit B0112 receives the information request including the inquiry ID from the communication unit B0108 of the mobile terminal B0101, the conversion information determination unit B0113 obtains, from the ID correspondence information holding unit B0114, the ID correspondence information that corresponds to the received inquiry ID. Subsequently, the conversion information determination unit B0113 passes the obtained ID correspondence information to the communication unit B0112. The communication unit B0112 transmits the ID correspondence information to the mobile terminal B0101 via the public network B0130.

Figure 2:
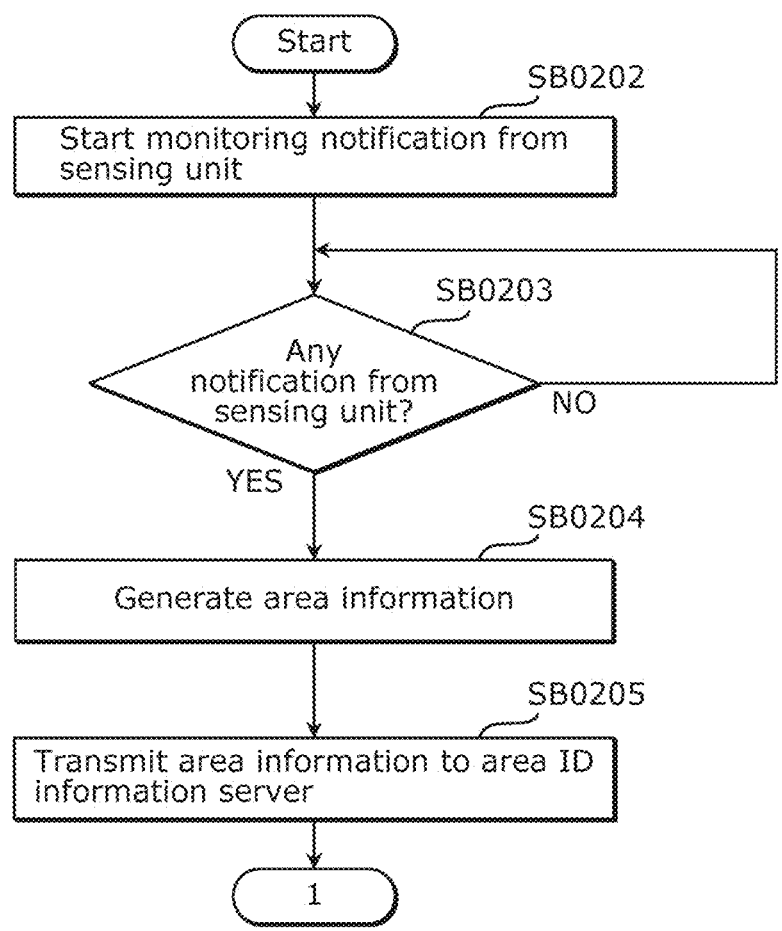
FIG. 2 is a flowchart of an area detection process performed by a mobile terminal in Embodiment 1.

The following describes the above operation in detail. Firstly, an area detection process by the mobile terminal B0101 is described. FIG. 2 is a flowchart of the area detection process by the mobile terminal B0101.

Firstly, in Step SB0202, the area detection unit B0102 starts monitoring notification from the sensing unit B0103 to prepare for calculating an area in which the mobile terminal B0101 is present.

Next, in Step SB0203, the area detection unit B0102 checks whether or not notification from the sensing unit B0103 has been received. When no notification has been received (NO in Step SB0203), the checking is performed again after a predetermined length of time (SB0203). On the other hand, when notification has been received (YES in SB0203), the process proceeds to Step SB0204.

In Step SB0204, the area detection unit B0102 generates, based on the notification from the sensing unit B0103, area information indicating an area in which the mobile terminal B0101 is present. The area detection unit B0102 then passes the generated area information to the inquiry ID generation unit B0104.

In Step SB0205, the inquiry ID generation unit B0104 transmits, to the area ID information server B0141, area information received from the area detection unit B0102.

Figure 3:
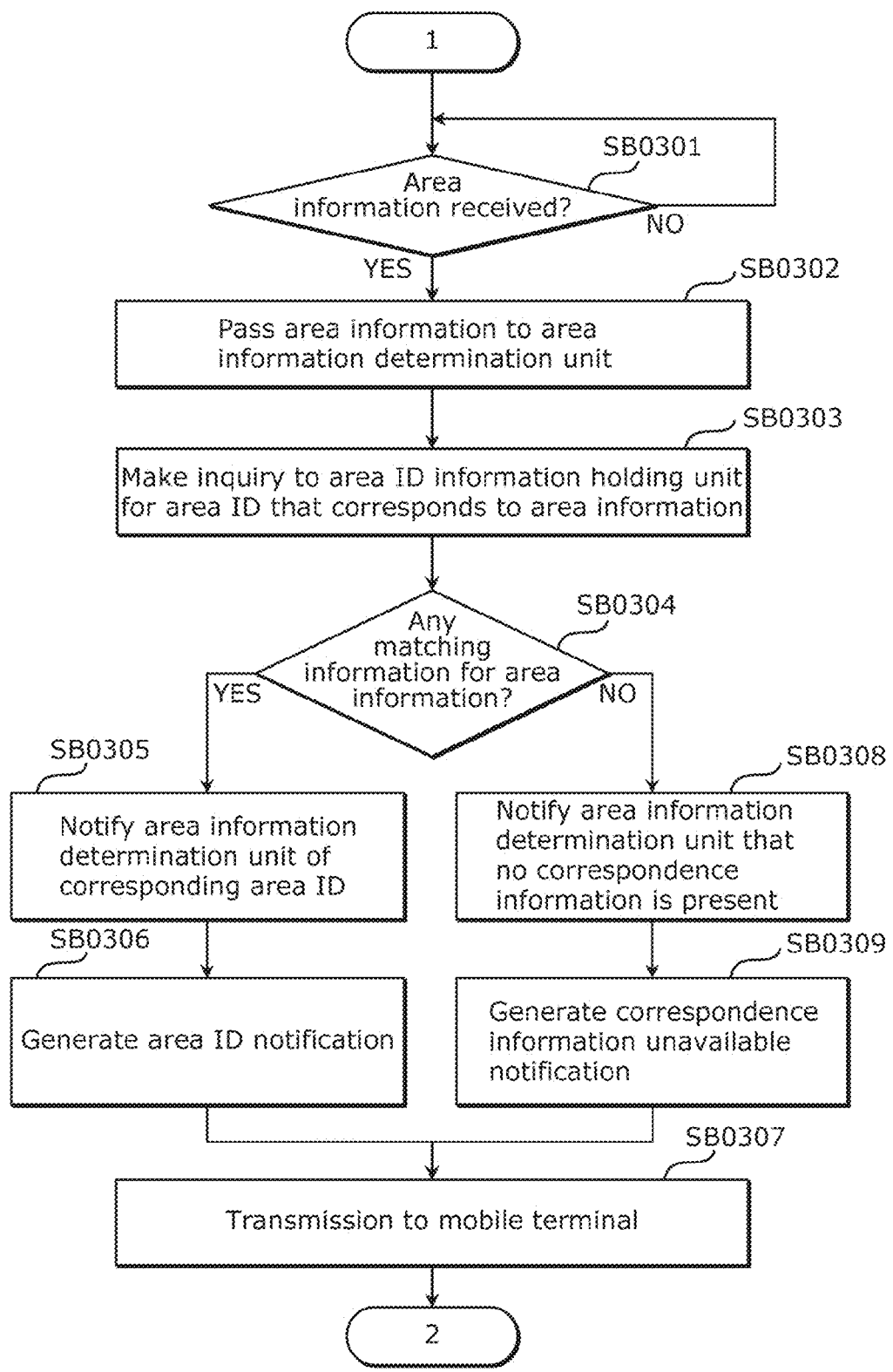
FIG. 3 is a flowchart of a process performed by an area ID information server when area ID information is requested from the mobile terminal in Embodiment 1.

FIG. 3 is a flowchart of the process by the area ID information server B0141 when the area ID information is requested from the mobile terminal B0101.

The process proceeds from Step SB0205 in FIG. 2 to Step SB0301 in FIG. 3. In Step SB0301, the communication unit B0142 of the area ID information server B0141 checks whether or not the area information detected by the mobile terminal B0101 has been received. When the area information has not been received (NO in SB0301), the checking is performed again. When the area information has been received (YES in SB0301), the process proceeds to Step SB0302.

In Step SB0302, the communication unit B0142 passes the received area information to the area information determination unit B0143. Next, in Step SB0303, the area information determination unit B0143 makes an inquiry to the area ID information holding unit B0144 for the area ID that corresponds to the received area information.

In Step SB0304, the area information determination unit B0143 checks whether or not information that matches the received area information is present in the area ID information table held by the area ID information holding unit B0144.

FIG. 4 illustrates an example of the area ID information table held by the area ID information server B0141. This area ID information table includes an area ID B1901 and area information corresponding to the area ID B1901. The area information includes at least one of Global Positioning System (GPS) information B1902, a wireless LAN access point identifier B1903, and store information B1904, for example.

As the wireless LAN access point identifier B1903, an identifier SSID of an access point or an identifier ESSID of a plurality of particular wireless LAN access points in combination is used, for example. Furthermore, the mobile terminal B0101 receives, for example, the store information B1904 from a Wi-FI (registered trademark) access point or a Bluetooth (registered trademark) communication device provided inside a store when a user enters the store.

In Step SB0304, when information matching the area information is present (YES in SB0304), the process proceeds to Step SB0305. In Step SB0305, the area ID information holding unit B0144 notifies the area information determination unit B0143 of a corresponding area ID. Next, in Step SB0306, the area information determination unit B0143 generates an area ID notification indicating the area ID and passes the generated area ID notification to the communication unit B0142. Next, in Step SB0307, the communication unit B0142 transmits the area ID notification received from the area information determination unit B0143, to the mobile terminal B0101 which requested the area ID.

On the other hand, in Step SB0304, when no matching information is present (NO in SB0304), the process proceeds to Step SB0308. In Step SB0308, the area ID information holding unit B0144 notifies the area information determination unit B0143 that no correspondence information is present in the area ID information table. Next, in Step SB0309, the area information determination unit B0143 generates correspondence information unavailable notification indicating that no corresponding area ID is present, and passes the generated correspondence information unavailable notification to the communication unit B0142. Next, in Step SB0307, the communication unit B0142 transmits the correspondence information unavailable notification received from the area information determination unit B0143, to the mobile terminal B0101 which requested the area ID.

Figure 5:
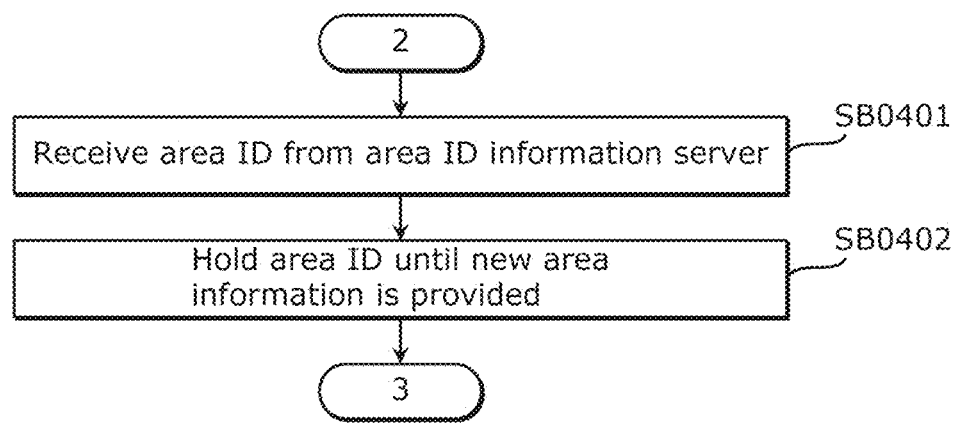
FIG. 5 is a flowchart of a process performed by the mobile terminal when the mobile terminal receives the area ID information from the area ID information server in Embodiment 1.

FIG. 5 is a flowchart of a process performed by the mobile terminal B0101 when the mobile terminal B0101 receives the area ID from the area ID information server B0141.

The process proceeds from Step SB0307 in FIG. 3 to Step SB0401 in FIG. 5. In Step SB0401, the communication unit B0108 receives the area ID notification including the area ID from the area ID information server B0141 and passes the received area ID to the inquiry ID generation unit B0104. Next, in Step SB0402, the inquiry ID generation unit B0104 holds an area ID indicated in the area ID notification until new area information is provided from the area detection unit B0102.

Figure 6:
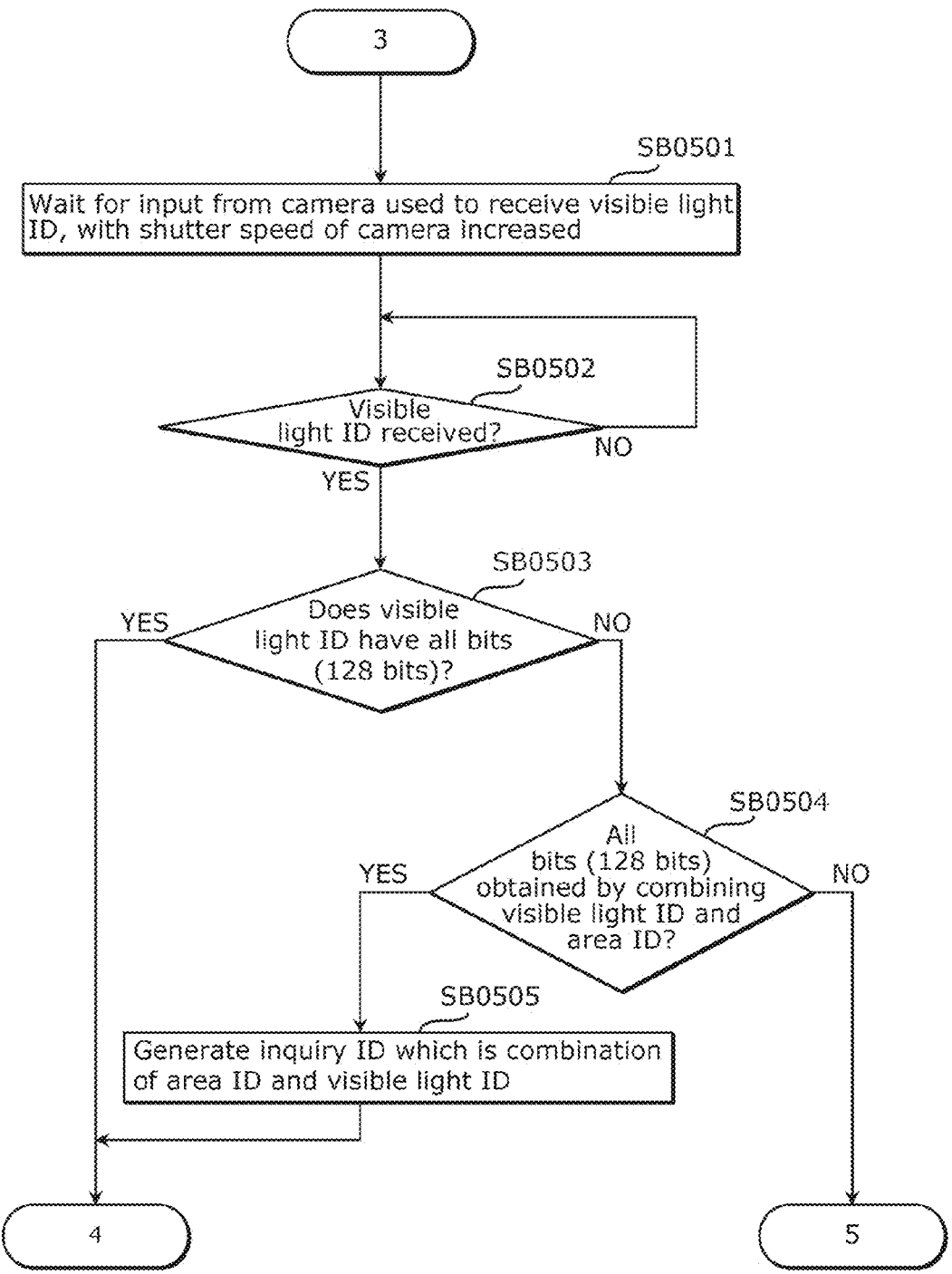
FIG. 6 is a flowchart of a process performed by the mobile terminal when the mobile terminal receives a visible light ID from a visible light transmitter in Embodiment 1.

FIG. 6 is a flowchart of the process performed by the mobile terminal B0101 when the mobile terminal B0101 receives the visible light ID from the visible light transmitter B0120.

The process proceeds from Step SB0402 in FIG. 5 to Step SB0501 in FIG. 6. In Step SB0501, the visible light ID reception unit B0105 waits for input from a camera that is used to receive the visible light ID, with the shutter speed of the camera increased.

In Step SB0502, the inquiry ID generation unit B0104 checks whether or not the visible light ID reception unit B0105 has received the visible light ID. When no visible light ID has been received (NO in Step SB0502), the checking is performed again after a predetermined length of time (SB0502). When the visible light ID has been received (YES in SB0502), the process proceeds to Step SB0503.

In Step SB0502, the inquiry ID generation unit B0104 checks whether or not the received visible light ID has all the bits (128 bits). Specifically, the inquiry ID generation unit B0104 determines whether or not the bit number of the received visible light ID is less than or equal to a predetermined bit number (128-bit). When the visible light ID has all the bits (YES in SB0502), the process proceeds to Step SB0601 in FIG. 7. When the visible light ID does not have all the bits (NO in SB0502), the process proceeds to Step SB0504.

In Step SB0504, the inquiry ID generation unit B0104 checks whether or not all the bits (128 bits) are obtained by combining the received visible light ID and the area ID received from the area ID information server B0141. Specifically, the inquiry ID generation unit B0104 determines whether or not the bit number of the received visible light ID and the area ID in total is less than or equal to the predetermined bit number (128-bit). When all the bits are not obtained (NO in SB0504), the process proceeds to Step SB0801 In FIG. 10. When all the bits are obtained (YES in SB0504), the process proceeds to Step SB0505.

In Step SB0505, the inquiry ID generation unit B0104 generates an inquiry ID which is a combination of the held area ID and visible light ID.

Figure 7:
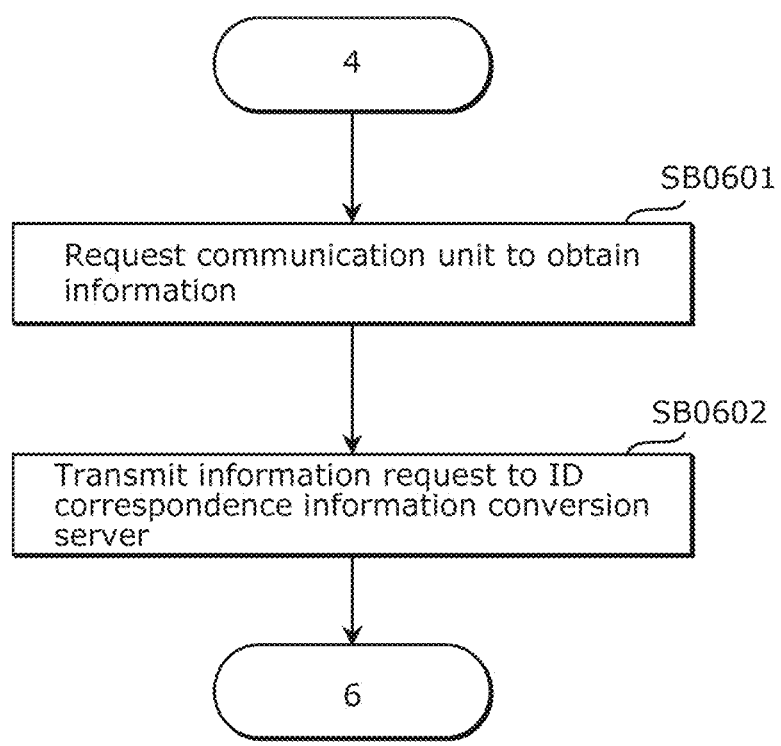
FIG. 7 is a flowchart of a process performed by the mobile terminal to request ID correspondence information in Embodiment 1.

FIG. 7 is a flowchart of the process performed by the mobile terminal B0101 to request the ID correspondence information.

When the result in Step SB0502 in FIG. 6 is NO and after Step SB0505, the process proceeds to Step SB0601. In Step SB0601, in order to obtain information related to the inquiry ID (the visible light ID itself or the ID which is a combination of the visible light ID and the area ID), the inquiry ID generation unit B0104 requests the communication unit B0108 for the information. Next, in Step SB0602, the communication unit B0108 transmits an information request for obtaining ID correspondence information that corresponds to the inquiry ID to the ID correspondence information conversion server B0111 via the public network B0130.

Figure 8:
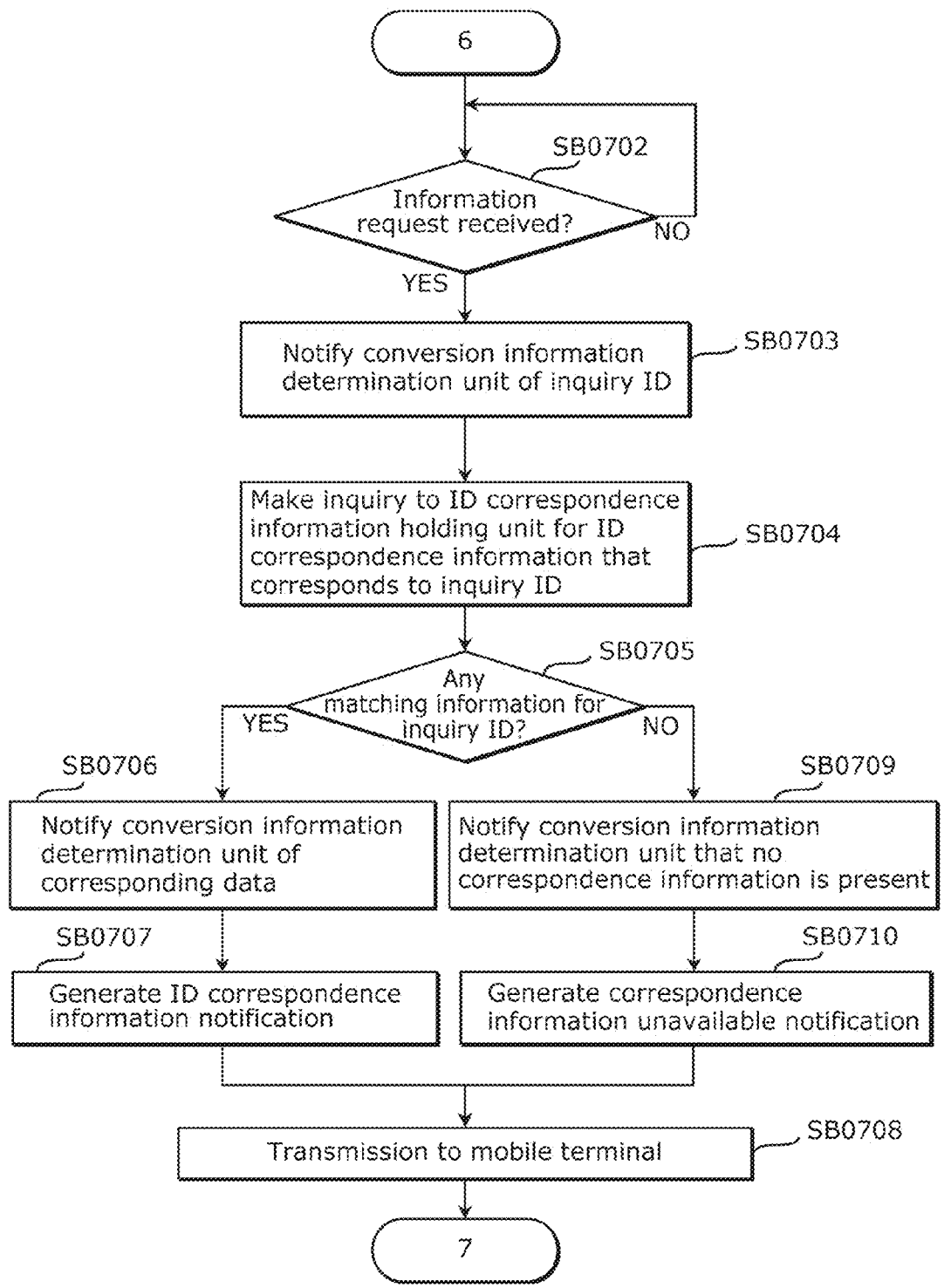
FIG. 8 is a flowchart of a process performed by an ID correspondence information conversion server when the ID correspondence information is requested by the mobile terminal in Embodiment 1.

FIG. 8 is a flowchart of the process performed by the ID correspondence information conversion server B0111 when the ID correspondence information is requested by the mobile terminal B0101.

The process proceeds from Step SB0602 in FIG. 7 to Step SB0702 In FIG. 8. In Step SB0702, the communication unit B0112 of the ID correspondence information conversion server B0111 checks whether or not the information request including the inquiry ID has been received. When no information request has been received (NO in Step SB0702), the checking is performed again after a predetermined length of time (SB0702). When the information request has been received (YES in SB0702), the process proceeds to Step SB0703.

In Step SB0703, the communication unit B0112 notifies the conversion information determination unit B0113 of the received inquiry ID. Next, in Step SB0704, the conversion information determination unit B0113 makes an inquiry to the ID correspondence information holding unit B0114 for the ID correspondence information that corresponds to the received inquiry ID. Next, in Step SB0705, the ID correspondence information holding unit B0114 checks whether or not information that matches the received inquiry ID is present in the held correspondence information table.

FIG. 9 illustrates an example of the correspondence information table held by the ID correspondence information holding unit B0114. The correspondence information table illustrated in FIG. 9 includes a plurality of inquiry IDs B1801 and ID correspondence information B1802 that corresponds to each of the inquiry IDs B1801. The inquiry ID B1801 corresponds to the inquiry ID generated by the inquiry ID generation unit B0104 of the mobile terminal B0101 and includes, for example, a 128-bit string which includes the visible light ID received by the mobile terminal B0101 from the visible light transmitter B0120. The ID correspondence information B1802 is information for each of the IDs, such as URL, which corresponds to the inquiry ID B1801.

In Step SB0705, when information matching the inquiry ID is present (YES in SB0705), the process proceeds to Step SB0706. In Step SB0706, the ID correspondence information holding unit B0114 notifies the conversion Information determination unit B0113 of the ID correspondence information that corresponds to the inquiry ID in the correspondence information table.

Next, in Step SB0707, the conversion information determination unit B0113 generates ID correspondence information notification including the received ID correspondence information and passes the generated ID correspondence information notification to the communication unit B0112. Next, in Step SB0708, the communication unit B0112 transmits the ID correspondence information notification received from the conversion information determination unit B0113, to the mobile terminal B0201 that requested the ID correspondence information.

On the other hand, in Step SB0702, when no matching information is present (NO in SB0702), the process proceeds to Step SB0709. In Step SB0709, the ID correspondence information holding unit B0114 notifies the conversion information determination unit B0113 that no correspondence information is present in the correspondence information table. Next, in Step SB0710, the conversion information determination unit B0113 generates correspondence information unavailable notification indicating that no correspondence information is present in the correspondence information table, and passes the generated correspondence information unavailable notification to the communication unit B0112. Next, in Step SB0708, the communication unit B0112 transmits the correspondence information unavailable notification received from the conversion information determination unit B0113, to the mobile terminal B0101 that requested the ID correspondence information.

Figure 10:
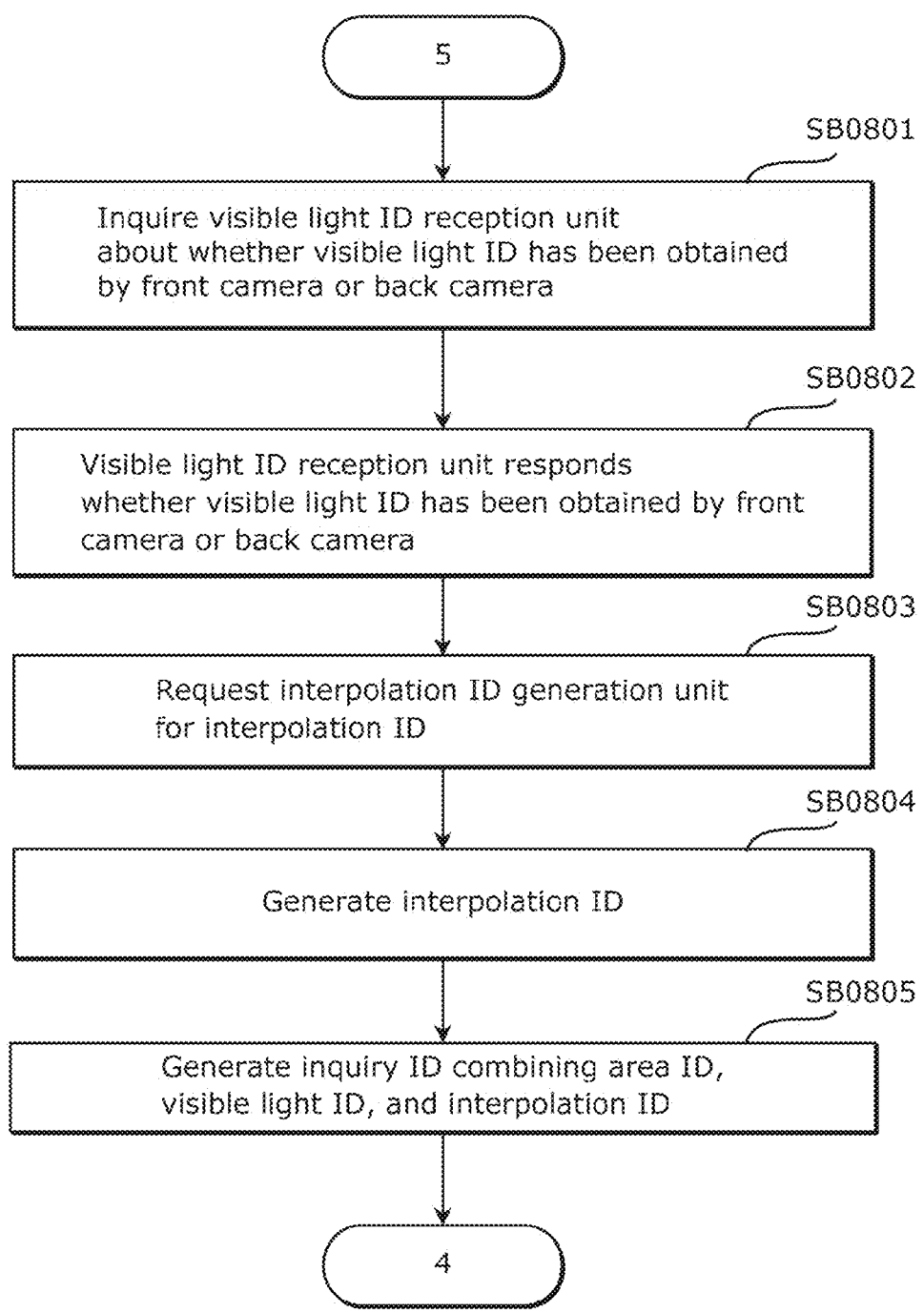
FIG. 10 is a flowchart of a process performed by the mobile terminal when the mobile terminal receives a short ID from the visible light transmitter in Embodiment 1.

FIG. 10 is a flowchart of the process performed by the mobile terminal B0101 when the mobile terminal B0101 receives a short ID from the visible light transmitter B0120.

When the result in Step SB0504 in FIG. 6 is NO, the process proceeds to Step SB0801 in FIG. 10. In Step SB0801, the inquiry ID generation unit B0104 makes an inquiry to the visible light ID reception unit B0105 about whether the received visible light ID has been obtained by the front camera B0106 or the back camera B0107. Next, in Step SB0802, the visible light ID reception unit B0105 responds back to the inquiry ID generation unit B0104 whether the visible light ID has been obtained by the front camera B0106 or the back camera B0107.

Next, in Step SB0803, the inquiry ID generation unit B0104 requests the interpolation ID generation unit B0110 to generate the interpolation ID which is to be added to the visible light ID. Next, in Step SB0804, the interpolation ID generation unit B0110 generates the interpolation ID using the sensing data received from the sensing unit B0103 or the user information held by the user information holding unit B0151, and passes the generated interpolation ID to the inquiry ID generation unit B0104.

Next, in Step SB0805, the inquiry ID generation unit B0104 generates an inquiry ID which is a combination of the held area ID, visible light ID, and interpolation ID.

Figure 11:
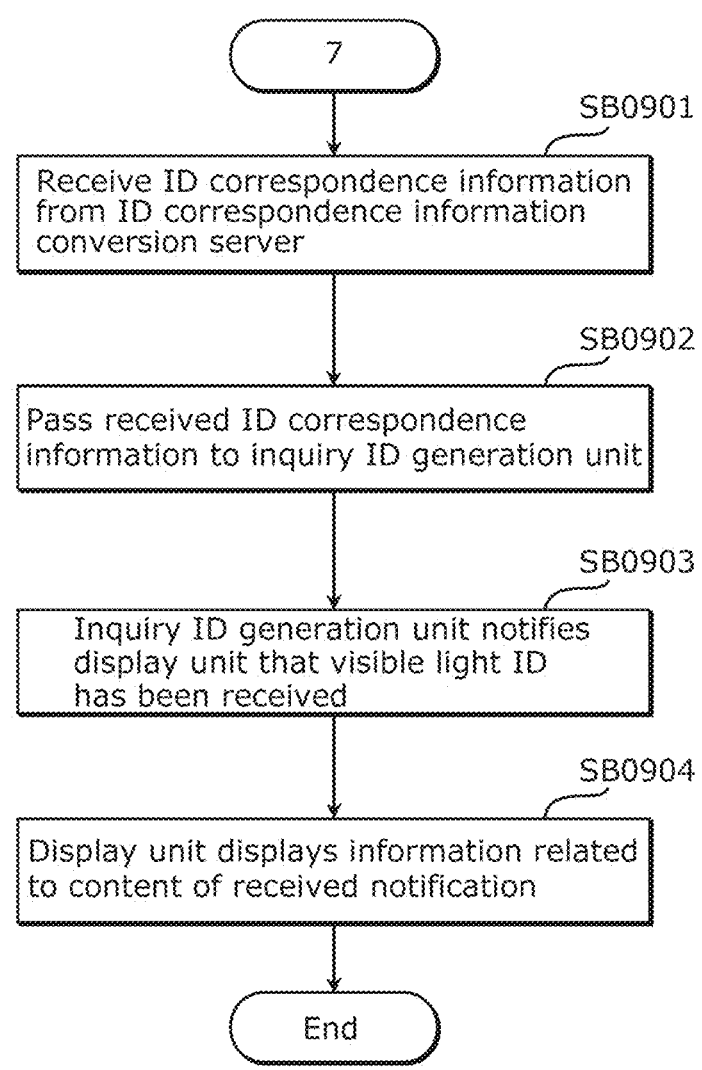
FIG. 11 is a flowchart of a process performed by the mobile terminal to display information in Embodiment 1.

FIG. 11 is a flowchart of the process performed by the mobile terminal B0101 to display information.

The process proceeds from Step SB0708 in FIG. 8 to Step SB0901 in FIG. 11. In Step SB0901, the communication unit B0108 of the mobile terminal B0101 receives the ID correspondence information notification including the ID correspondence information from the ID correspondence information conversion server B0111 via the public network B0130. Next, in Step SB0902, the communication unit B0108 of the mobile terminal B0101 passes the received ID correspondence information to the inquiry ID generation unit B0104.

Next, in Step SB0903, the inquiry ID generation unit B0104 notifies the display unit B0109 that the visible light ID has been received. Next, in Step SB0904, the display unit B0109 displays information related to the content of received notification.

Figure 12:
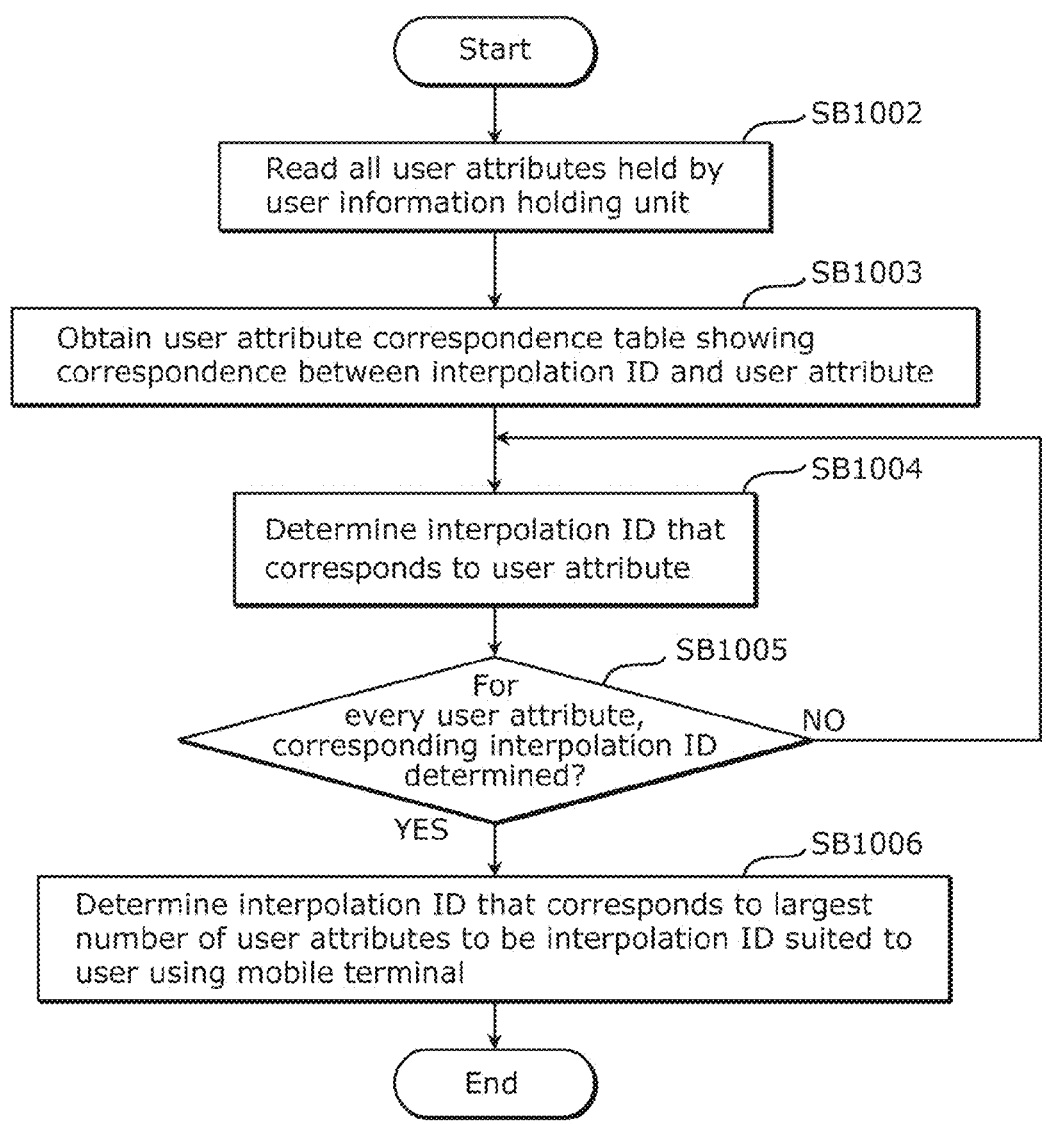
FIG. 12 is a flowchart of a process performed by an interpolation ID generation unit to generate an interpolation ID based on a user attribute in Embodiment 1.

FIG. 12 is a flowchart of the process in which the interpolation ID generation unit B0110 generates the interpolation ID based on a user attribute. In this flowchart, the user information indicated in FIG. 13 and a user attribute correspondence table indicated in FIG. 14 which shows correspondence between the interpolation ID and the user attribute are used.

FIG. 13 illustrates an example of the user information held by the user information holding unit B0151. This user information includes an attribute name B1601, such as name and sex, which represents the user attribute and an attribute value B1602 of a user which corresponds to the attribute name B1601.

FIG. 14 illustrates an example of the user attribute correspondence table used by the interpolation ID generation unit B0110 to select the interpolation ID based on the user attribute. This user attribute correspondence table includes an interpolation ID B1701 and a user attribute B1702 associated with the interpolation ID B1701.

The Interpolation ID generation unit B0110 checks whether or not the user information indicated in a user attribute table illustrated in FIG. 13 matches the condition indicated in the user attribute B1702, and selects the interpolation ID B1701 associated with the condition which the user information matches.

For example, the user information illustrated in FIG. 13 indicates that a sex B1603 is male, a membership rank B1604 is premium, and an age B1605 is 35 years old, with the result that the interpolation ID "1B1" in FIG. 14 is selected.

The following describes the process indicated in FIG. 11. Firstly, in Step SB1002, the interpolation ID generation unit B0110 reads all user attributes held by the user information holding unit B0151. Next, in Step SB1003, the interpolation ID generation unit B0110 retrieves the user attribute correspondence table held therein which shows correspondence between the interpolation ID and the user attribute to select the interpolation ID. It is to be noted that in the case of not holding the user attribute correspondence table, the interpolation ID generation unit B0110 may obtain the user attribute correspondence table from an external server via a network.

Next, in Step SB1004, the interpolation ID generation unit B0110 determines the interpolation ID that corresponds to the user attribute read from the user information holding unit B0151 and is defined in the user attribute correspondence table. Next, in Step SB1005, the interpolation ID generation unit B0110 checks whether or not every user attribute read from the user information holding unit B0151 has been checked for its correspondence with the interpolation ID. When the checking has not been completed (NO in SB1005), the process proceeds to Step SB1004. On the other hand, when every user attribute has been checked for its correspondence with the interpolation ID (YES in SB1005), the process proceeds to Step SB1006.

In Step SB1006, the interpolation ID generation unit B0110 determines, for example, the interpolation ID that corresponds to the largest number of user attributes to be the interpolation ID suitable for the user who is using the mobile terminal B0101, and passes the interpolation ID to the inquiry ID generation unit B0104.

Figure 15:
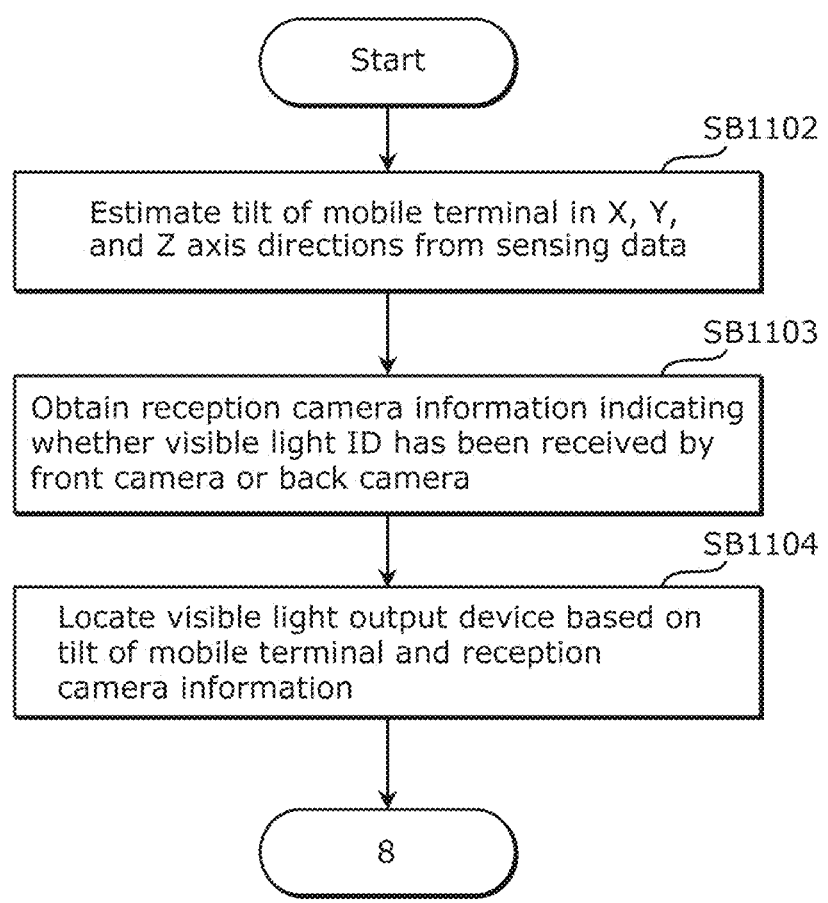
FIG. 15 is a flowchart of a process performed by the interpolation ID generation unit to identify an installation location of the visible light transmitter based on sensing data and reception camera information in Embodiment 1.

The following describes the process in which the interpolation ID generation unit B0110 identifies an installation location of the visible light transmitter B0120 based on the sensing data and reception camera information. FIG. 15 is a flowchart of this process. This flowchart assumes identification of a location of the visible light transmitter B0120 under the situation illustrated in FIG. 17.

Firstly, in Step SB1102, from the sensing data detected by an accelerometer, a gyroscope, and a geomagnetic sensor and received from the sensing unit B0103, the interpolation ID generation unit B0110 estimates the tilt of the mobile terminal B0101 in X, Y, and Z axis directions measured at the time when the mobile terminal B0101 receives the visible light ID from the visible light transmitter B0120.

Next, in Step SB1103, when receiving the visible light ID from the inquiry ID generation unit B0104, the interpolation ID generation unit B0110 obtains reception camera information indicating whether the visible light ID has been received by the front camera B0106 or the back camera B0107 of the mobile terminal B0101.

Next, in Step SB1104, the interpolation ID generation unit B0110 locates the visible light transmitter B0120 based on the tilt of the mobile terminal B0101 estimated in Step SB1102 and the reception camera information obtained in Step SB1103.

Figure 16:
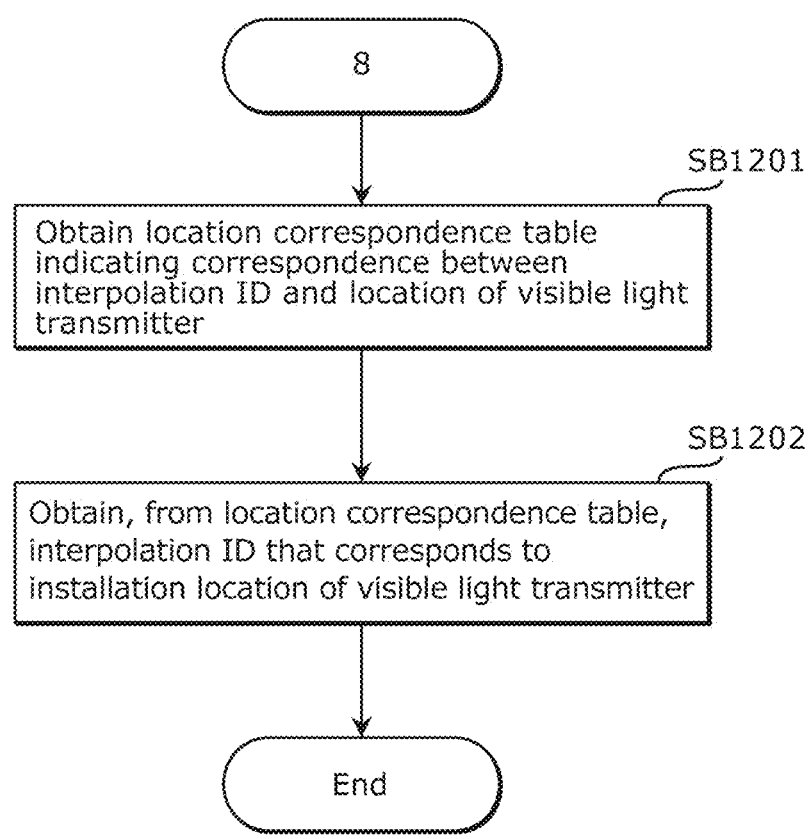
FIG. 16 is a flowchart of a process performed by an interpolation ID generation unit to generate the interpolation ID based on the installation location of the visible light transmitter in Embodiment 1.

FIG. 16 is a flowchart of the process in which the interpolation ID generation unit B0110 generates the interpolation ID based on the Installation location of the visible light transmitter B0120.

The process proceeds from Step SB1104 in FIG. 15 to Step SB1201 in FIG. 16. In Step SB1201, the interpolation ID generation unit B0110 retrieves a location correspondence table held therein which shows correspondence between the interpolation ID and the location of the visible light transmitter B0120, in order to select the interpolation ID that corresponds to the installation location of the visible light transmitter B0120. It is to be noted that in the case of not holding the location correspondence table, the interpolation ID generation unit B0110 may obtain the location correspondence table from an external server or the like via a network.

Next, in Step SB1202, the interpolation ID generation unit B0110 obtains, from the location correspondence table, the interpolation ID that corresponds to the identified installation location of the visible light transmitter B0120, and passes the interpolation ID to the inquiry ID generation unit B0104.

FIG. 17, FIG. 18A, FIG. 18B, and FIG. 19 illustrate, in detail, the situations indicated in the flowcharts of FIG. 15 and FIG. 16 in which the interpolation ID generation unit B0110 generates the interpolation ID based on the installation location of the visible light transmitter B0120.

Figure 17:
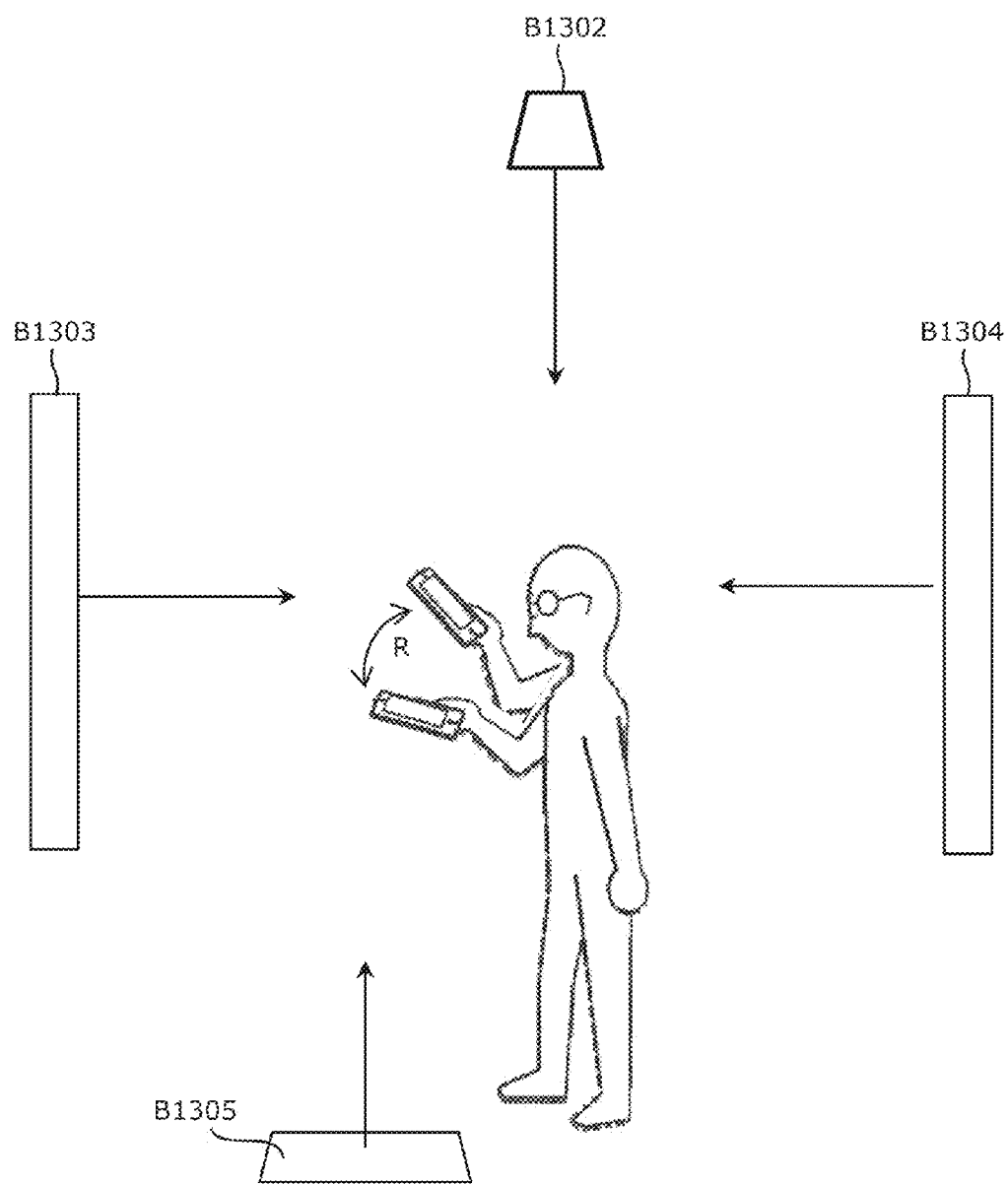
FIG. 17 illustrates an example in which the interpolation ID generation unit locates the visible light transmitter in Embodiment 1.

FIG. 17 illustrates the visible light transmitters B0120 which surround a user who is using the mobile terminal B0101.

A visible light transmitter B1302 is a visible light transmitter such as lighting on a ceiling; a visible light transmitter B1303 is a visible light transmitter such as signage in front of the user; a visible light transmitter B1304 is a visible light transmitter such as signage behind the user; and a visible light transmitter B1305 is a visible light transmitter such as lighting on a floor.

The interpolation ID generation unit B0110 identifies whether the received visible light ID originates from the visible light transmitter B1302, B1303, B1304, or B1305, using an angle R of the tilt of the mobile terminal B0101 and the reception camera information indicating whether the camera that received the visible light ID is the front camera B0106 or the back camera B0107.

Figure 18A:
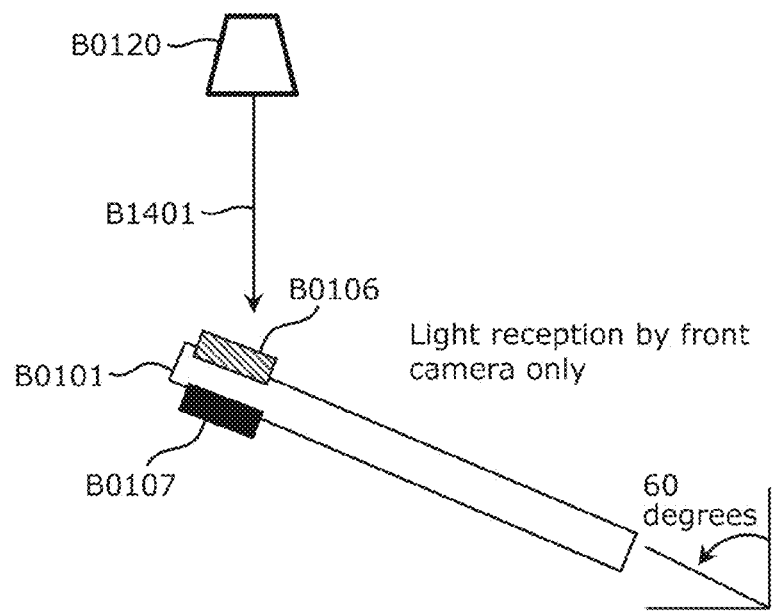
FIG. 18A illustrates an example in which the interpolation ID generation unit selects a front camera according to an orientation of the mobile terminal in Embodiment 1.
Figure 18B:
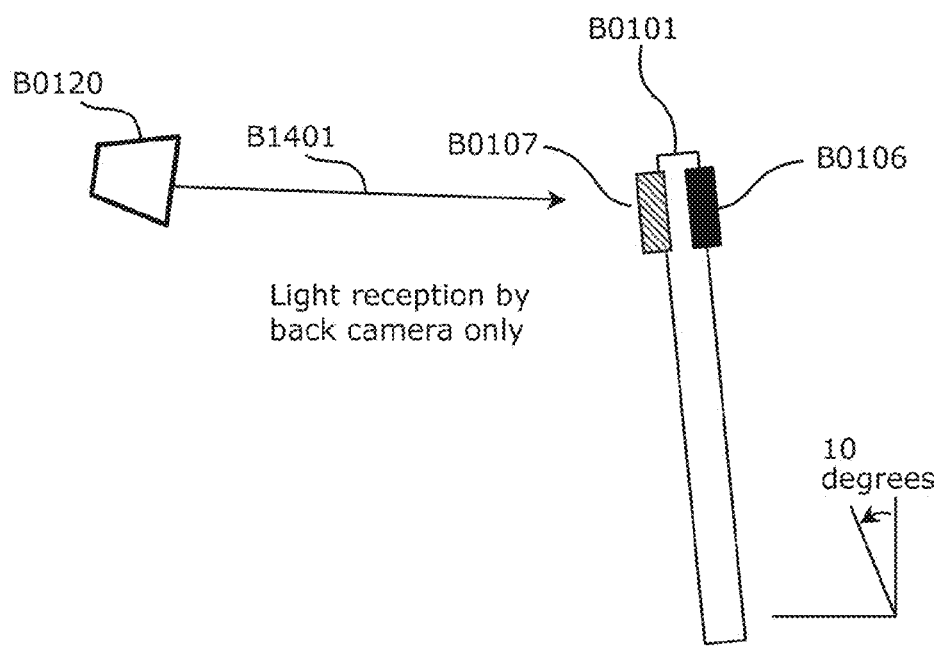
FIG. 18B illustrates an example in which the interpolation ID generation unit selects a back camera according to an orientation of the mobile terminal in Embodiment 1.

Furthermore, the mobile terminal B0101 selects, using a housing orientation detected using the sensing unit B0103, a camera that receives the visible light ID. FIG. 18A and FIG. 18B illustrate examples of this operation.

The mobile terminal B0101 detects the housing orientation from the sensing data generated by the sensing unit B0103, selects one of the front camera B0106 and the back camera B0107 based on the housing orientation, and receives visible light B1401 with the selected camera only. By doing so, inducement of a wrong operation due to reflected light or the like cause can be reduced. In addition, power consumption can be reduced.

For example, as illustrated in FIG. 18A, the mobile terminal B0101 activates only the front camera B0106 when the tilt of the mobile terminal B0101 is 45 degrees or more. As illustrated in FIG. 18B, the mobile terminal B0101 activates only the back camera B0107 when the tilt of the mobile terminal B0101 is less than 45 degrees. It is to be noted that the angle indicated herein is an angle formed by a tilt with the front surface (the display screen) facing upward where the direction that is vertically upward is assumed to be the reference as illustrated in FIG. 18A and FIG. 18B.

FIG. 19 illustrates an example of the location correspondence table used by the interpolation ID generation unit B0110 to select the interpolation ID based on a device location.

The location correspondence table illustrated in FIG. 19 includes: an interpolation ID B1504; reception camera information B1501 indicating a camera used to receive the visible light ID; angle information B1502 indicating an angle R of the tilt of the mobile terminal B0101; and location information B1503 indicating a location of the visible light transmitter B0120 estimated based on the reception camera Information B1501 and the angle information B1502. Furthermore, when the same visible light transmitter B0120 is designated in the location information B1503, the same interpolation ID B1504 is assigned.

As an example, information in the first row in FIG. 19 is described. When the front camera B0106 is used to receive the visible light ID and the angle of the mobile terminal B0101 is in the range of 315 degrees to 360 degrees or from zero degree to 45 degrees, the mobile terminal B0101 determines that the visible light transmitter that transmitted the visible light ID is the visible light transmitter behind the user who is using the mobile terminal B0101 (the visible light transmitter B1304 in FIG. 17). Furthermore, the mobile terminal B0101 identifies the interpolation ID in this case as "1C1."

The following describes a specific use case of this embodiment. FIG. 20 illustrates a usage case of this embodiment.

In FIG. 20, a user visits a store in (1) and takes out the mobile terminal B0101 on a specific sales floor in the store (2), and information received from the ID correspondence information conversion server B0111 is displayed on a screen of the mobile terminal B0101.

Figure 21:
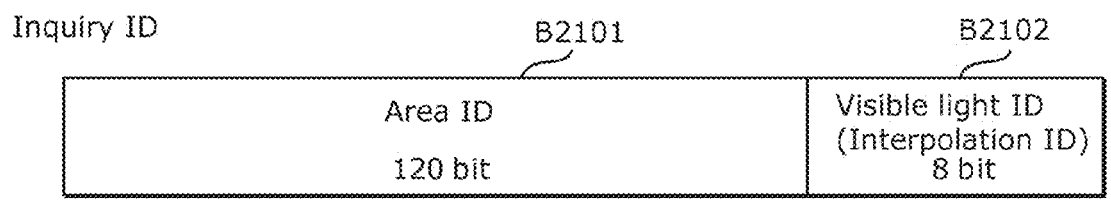
FIG. 21 illustrates a configuration example of an inquiry ID which is transmitted from the mobile terminal to the ID correspondence information conversion server in Embodiment 1.

FIG. 21 illustrates a configuration example of the inquiry ID which the mobile terminal B0101 transmits to the ID correspondence information conversion server B0111.

The inquiry ID is an identification number for accessing particular information via the WEB. Although this embodiment describes the length of the bit string of the whole inquiry ID as 128 bits, the inquiry ID may have any bit length.

The inquiry ID includes a 120-bit area ID B2101 provided from the area ID information server B0141, and an 8-bit particular ID B2102. The particular ID B2102 includes at least one of the visible light ID received from the visible light transmitter B0120 and the Interpolation ID generated from the user information held by the mobile terminal B0101. The area ID B2101 is a bit string used to identify a store, an area, or the like. The particular ID B2102 is a bit string used to identify a given location inside the store or area.

It is to be noted that the internal configuration of the inquiry ID may be other than the above configuration. For example, the bit numbers of the area ID B2101 and the particular ID B2102 are not limited to the above bit numbers. For example, the inquiry ID may include a 110-bit area ID and a 18-bit particular ID.

Furthermore, the sequence of the area ID B2101 and the particular ID B2102 may be any sequence; the particular ID B2102 may be placed before the area ID B2101. Furthermore, it may be that no area ID B2101 but only the 128-bit particular ID 2102 is included in the inquiry ID. For example, the inquiry ID may include the visible light ID and the interpolation ID only. Here, the interpolation ID includes at least one of the ID that corresponds to the orientation, etc., of the mobile terminal B0101 and the ID that corresponds to the user attribute.

Figure 22:
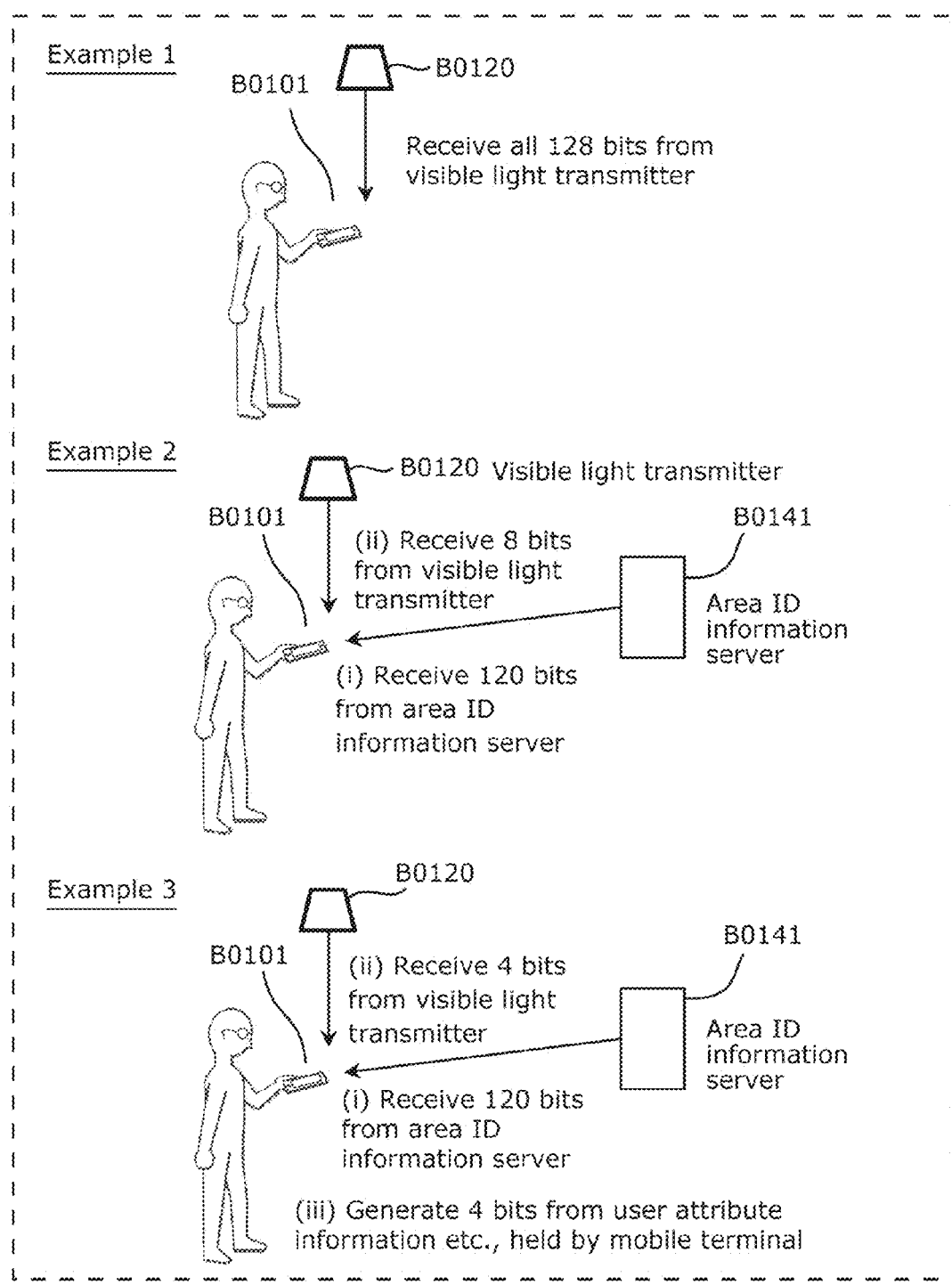
FIG. 22 illustrates an example in which the mobile terminal generates the inquiry ID in Embodiment 1.

FIG. 22 illustrates an example in which the mobile terminal B0101 generates the inquiry ID.

In Example 1, the mobile terminal B0101 receives the whole 128-bit inquiry ID from the visible light transmitter B0120 not via the area ID information server B0141.

In Example 2, the mobile terminal B0101 receives the 120-bit area ID B2101 from the area ID information server B0141 and receives remaining 8-bit data from the visible light transmitter B0120.

In Example 3, the mobile terminal B0101 receives the 120-bit area ID from the area ID information server B0141, receives a 4-bit visible light ID from the visible light transmitter B0120, and generates remaining 4-bit data from the user attribute, etc., held by the mobile terminal B0101.

Figure 23:
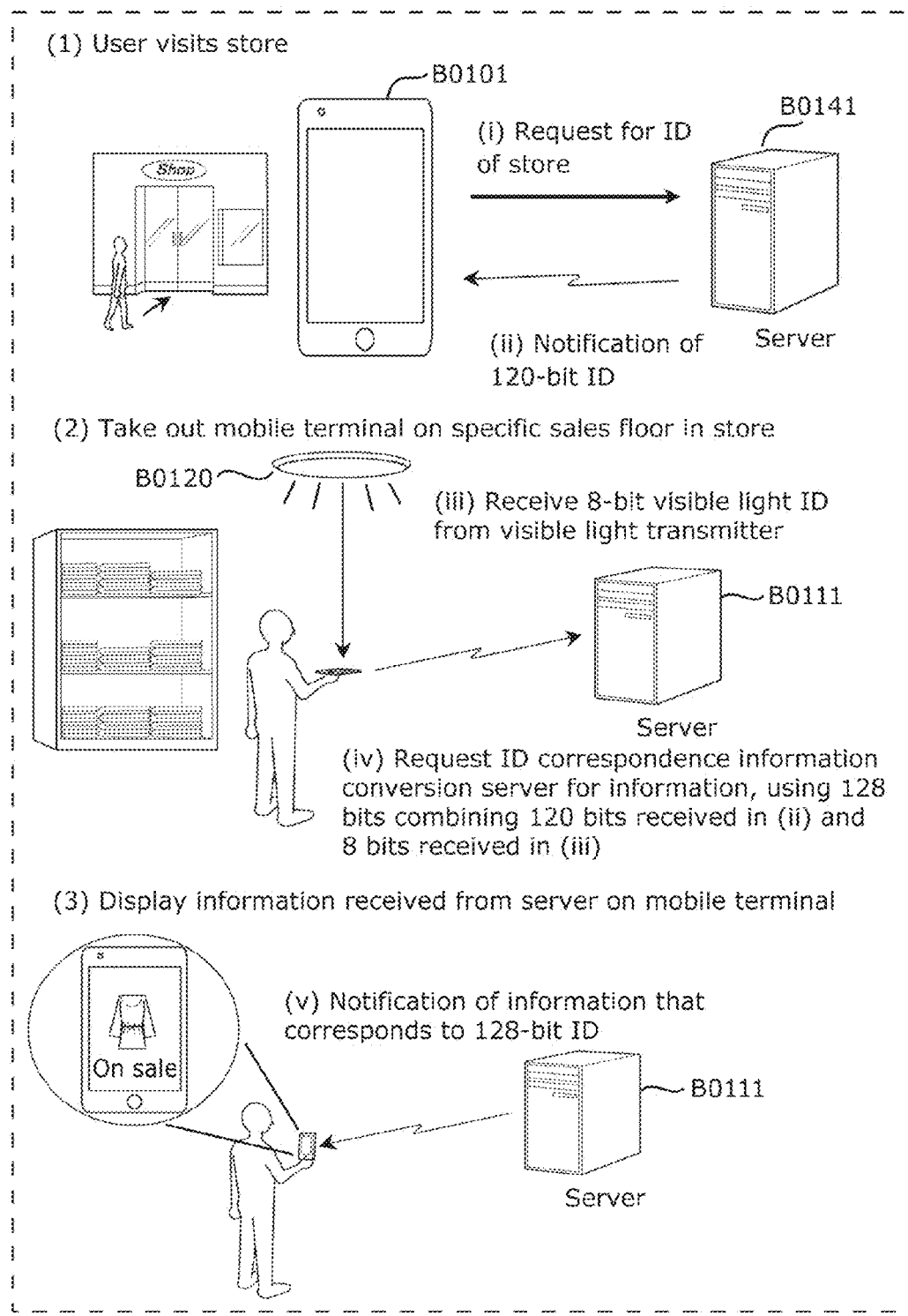
FIG. 23 illustrates a detailed use case of Example 2 in FIG. 22 in Embodiment 1.

FIG. 23 illustrates a detailed use case of Example 2 in FIG. 22.

FIG. 23 illustrates, in (1), a process in the mobile terminal B0101 which is performed when a user visits a store. The mobile terminal B0101 identifies a store using the GPS or communication of Wi-Fi, Bluetooth, sound, or the like, and requests the area ID information server B0141 for the 120-bit area ID that corresponds to the identified store.

FIG. 23 illustrates, in (2), a process in the mobile terminal B0101 which is performed when the user takes out the mobile terminal B0101 on a specific sales floor in the store. The mobile terminal B0101 receives an 8-bit visible light ID from the visible light transmitter B0120, then generates a 128-bit inquiry ID which is a combination of the 120-bit area ID received in (1) and the received 8-bit visible light ID, and requests the ID correspondence information conversion server B0111 for the information that corresponds to the inquiry ID.

In (3) of FIG. 23, the ID correspondence information conversion server B0111 distinguishes the information that corresponds to the 128-bit inquiry ID received from the mobile terminal B0101, and notifies the mobile terminal B0101 of the distinguished information. The mobile terminal B0101 displays, on its screen, the information received from the ID correspondence information conversion server B0111.

Figure 24:
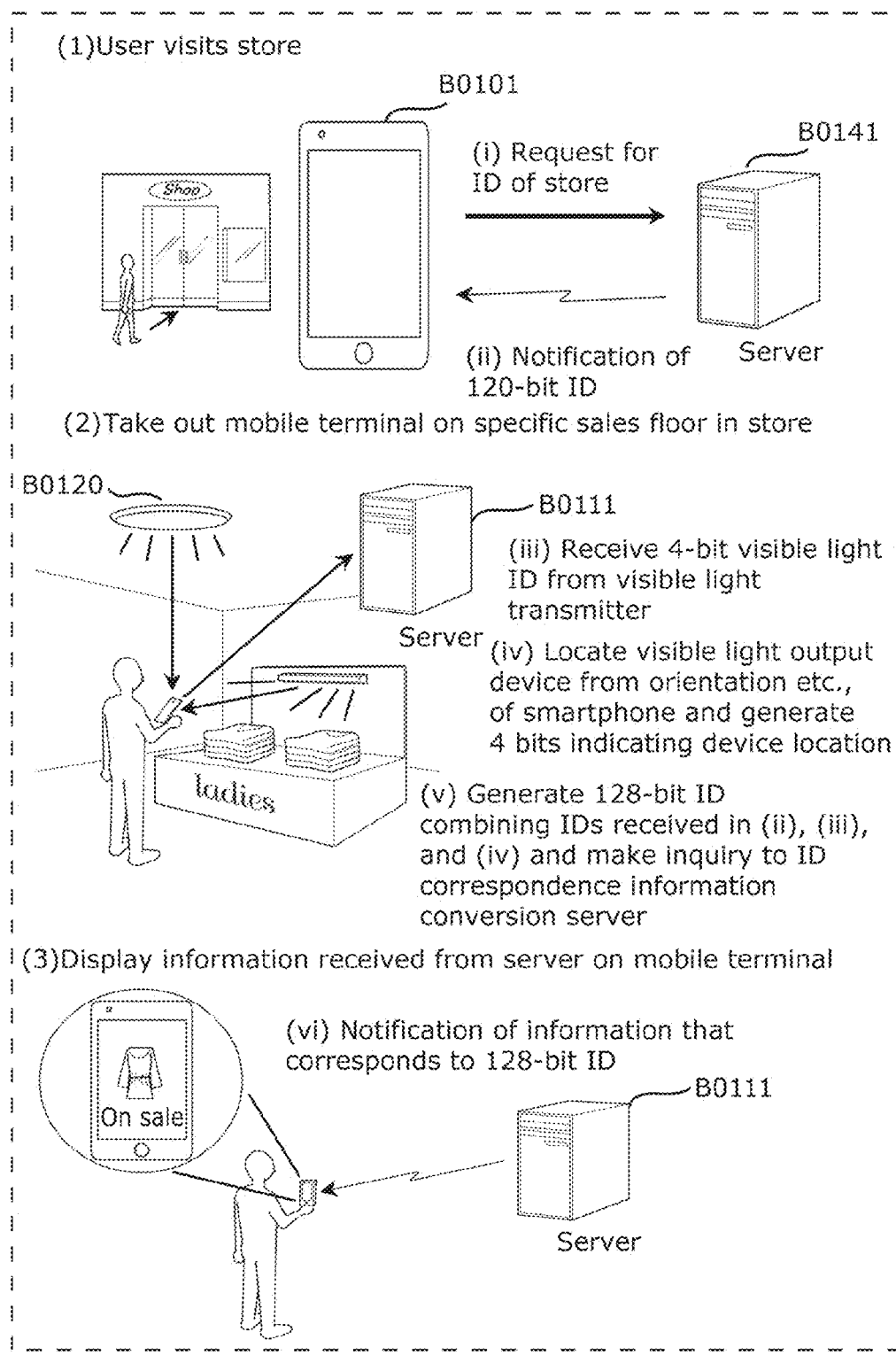
FIG. 24 illustrates a detailed use case of Example 3 In FIG. 22 in Embodiment 1.

FIG. 24 illustrates a detailed use case of Example 3 in FIG. 22.

FIG. 24 illustrates, in (1), a process in the mobile terminal B0101 which is performed when a user visits a store. The mobile terminal B0101 identifies a store using the GPS or communication of WI-FI, Bluetooth, sound, or the like, and requests the area ID information server for the 120-bit area ID that corresponds to the identified store.

FIG. 24 illustrates, in (2), a process in the mobile terminal B0101 which is performed when the user takes out the mobile terminal B0101 on a specific sales floor in the store. The mobile terminal B0101 receives a 4-bit visible light ID from the visible light transmitter B0120. Furthermore, the mobile terminal B0101 identifies a location of the visible light transmitter B0120 from an orientation, etc., of the mobile terminal B0101, and generates a 4-bit interpolation ID indicating the identified device location.

Next, the mobile terminal B0101 generates a 128-bit inquiry ID which is a combination of the 120-bit area ID received in (1), the 4-bit visible light ID received in (2), and the 4-bit interpolation ID, and requests the ID correspondence information conversion server B0111 for the information that corresponds to the inquiry ID.

In (3) of FIG. 24, the ID correspondence information conversion server B0111 distinguishes the information that corresponds to the 128-bit inquiry ID received from the mobile terminal B0101, and notifies the mobile terminal B0101 of the distinguished information. The mobile terminal B0101 displays, on its screen, the information received from the ID correspondence information conversion server B0111.

It is to be noted that although the mobile terminal B0101 identifies, from the sensing data, an area in which the mobile terminal B0101 is currently present, and makes an inquiry to the area ID information server B0141 for the area ID that corresponds to the identified area in the above description, the mobile terminal B0101 may receive the area ID itself as the above store information, for example, from a Wi-Fi access point or a Bluetooth communication device.

Figure 25:
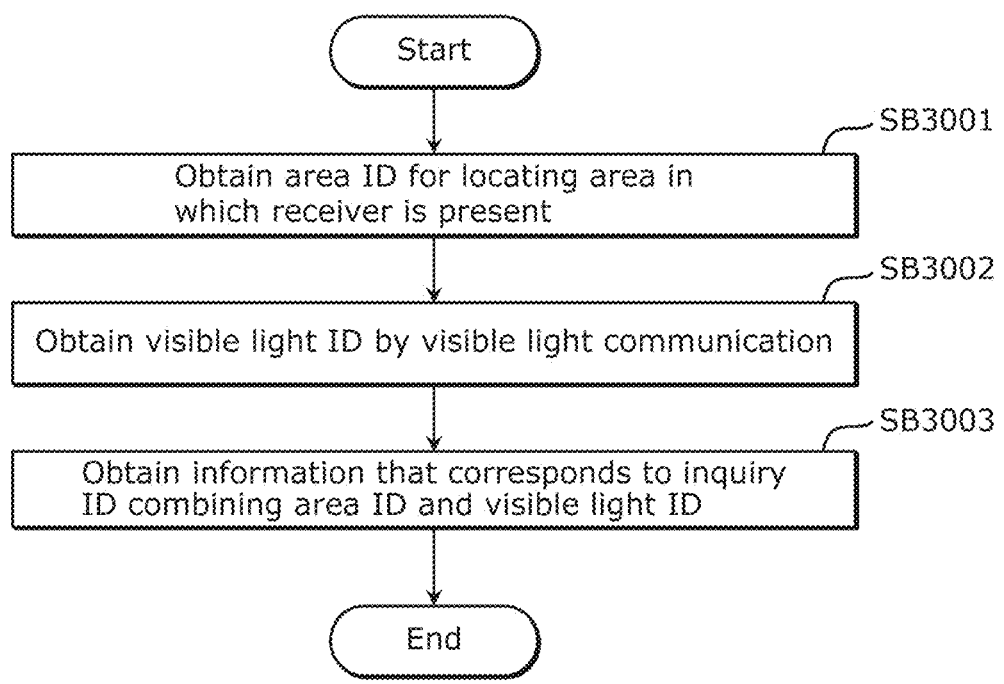
FIG. 25 is a flowchart of a visible light communication process in Embodiment 1.
Figure 26:
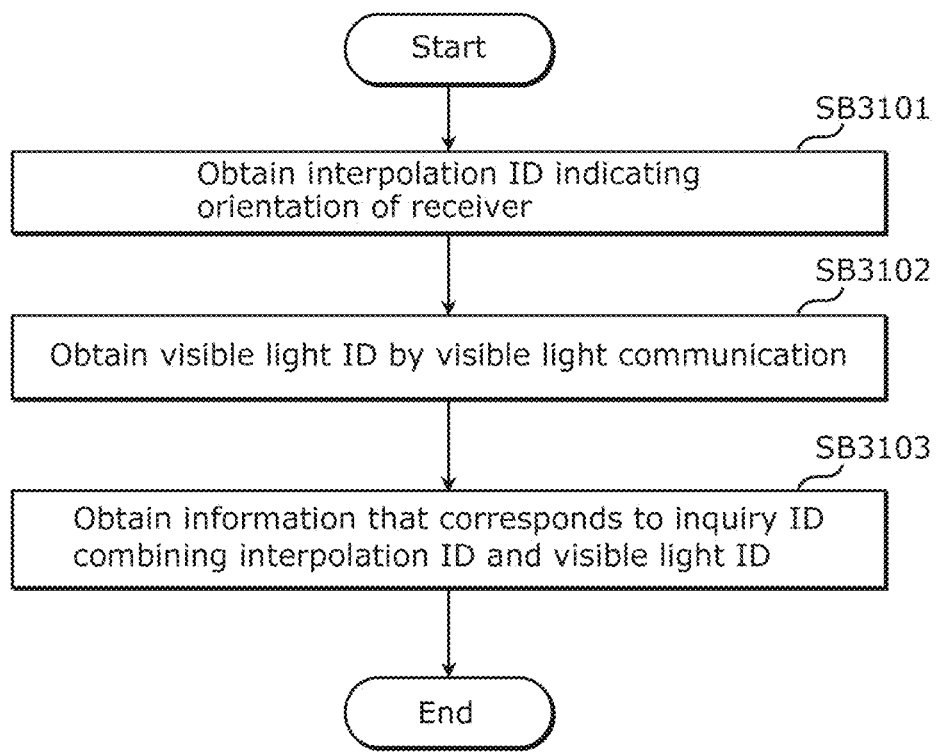
FIG. 26 is a flowchart of the visible light communication process in Embodiment 1.
Figure 27:
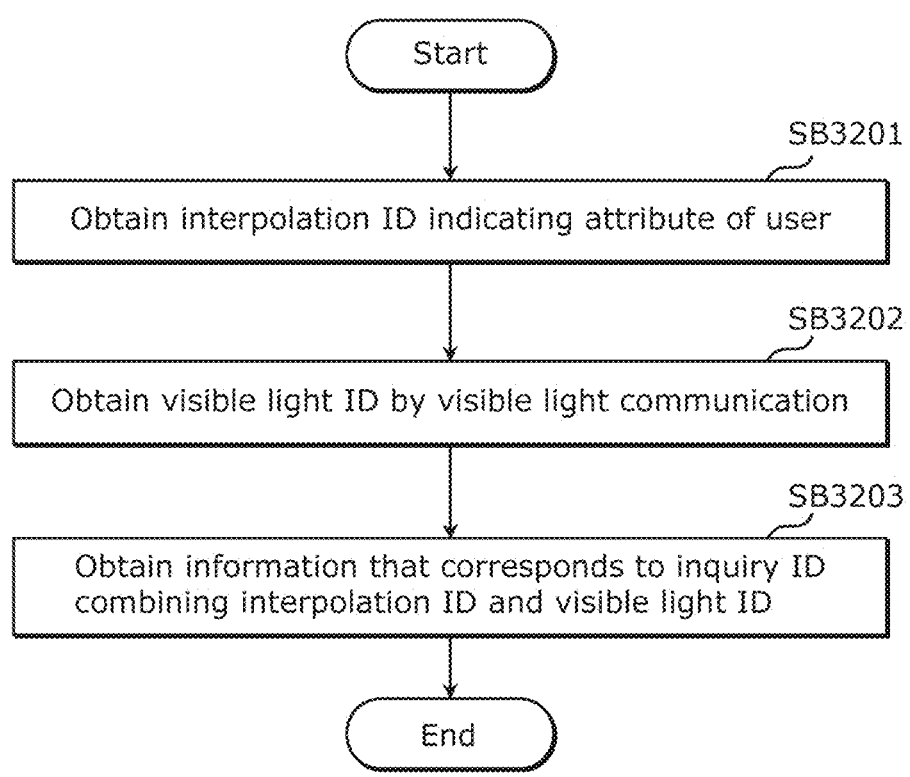
FIG. 27 is a flowchart of the visible light communication process in Embodiment 1.

As above, the visible light communication system according to this embodiment has the following features indicated in FIG. 25 to FIG. 27. As indicated in FIG. 25, a first ID obtaining unit (the area detection unit B0102 and the inquiry ID generation unit B0104) obtains an area ID (a first ID) identifying an area in which the receiver (the mobile terminal B0101) is present (SB3001). It is to be noted that the first ID obtaining unit may obtain the area ID from an external server (the area ID information server B0141) and may directly obtain the area ID from a Bluetooth communication device or the like installed in the store, etc. For example, the first ID obtaining unit obtains the area ID by referring to the area ID information table illustrated in FIG. 4, for example, which shows the correspondence between the area ID and the location information obtained by the receiver and indicating a location of the receiver. Furthermore, this location information is, for example, (1) information indicating a location of the receiver identified by the GPS installed on the receiver, (2) information indicating a wireless LAN access point accessible by the receiver, or (3) information obtained by the receiver and indicating the store in which the receiver is present.

Next, a second ID obtaining unit (the visible light ID reception unit B0105) obtains the visible light ID (a second ID) through the visible light communication in the area identified in Step SB3001 (SB3002).

At the end, an information obtaining unit (the inquiry ID generation unit B0104) obtains information corresponding to the inquiry ID (a third ID) which is a combination of the area ID (the first ID) and the visible light ID (the second ID) (SB3003). For example, the information obtaining unit generates the inquiry ID (the third ID) which is a combination of the area ID (the first ID) and the visible light ID (the second ID), and obtains information corresponding to the inquiry ID from an external server (the ID correspondence information conversion server B0111).

Furthermore, as indicated in FIG. 26, the first ID obtaining unit (the interpolation ID generation unit B0110) obtains the interpolation ID (the first ID) indicating an orientation of the receiver (the mobile terminal B0101) (SB3101). For example, the first ID obtaining unit obtains the interpolation ID indicating an orientation (tilt) of the receiver using information obtained by the sensor. Specifically, the first ID obtaining unit obtains the interpolation ID by referring to the location correspondence table illustrated in FIG. 19, for example, which shows the correspondence between the tilt of the receiver and the interpolation ID.

Next, the second ID obtaining unit (the visible light ID reception unit B0105) obtains the visible light ID (the second ID) through the visible light communication (SB3102).

At the end, the information obtaining unit (the inquiry ID generation unit B0104) obtains information corresponding to the inquiry ID (the third ID) which is a combination of the interpolation ID (the first ID) and the visible light ID (the second ID) (SB3003). For example, the information obtaining unit generates the inquiry ID (the third ID) which is a combination of the interpolation ID (the first ID) and the visible light ID (the second ID), and obtains information corresponding to the inquiry ID from an external server (the ID correspondence information conversion server B0111).

Here, the receiver may include the front camera B0106 and the back camera B0107 (the first camera and the second camera). Furthermore, the second ID obtaining unit may select one of the front camera B0106 and the back camera B0107 according to an orientation of the receiver and obtains the visible light ID using the selected camera.

Furthermore, as indicated in FIG. 27, the first ID obtaining unit (the interpolation ID generation unit B0110) obtains the interpolation ID (the first ID) indicating a user attribute of the receiver (the mobile terminal B0101) (SB3301). For example, the first ID obtaining unit obtains the interpolation ID by referring to the user attribute correspondence table illustrated in FIG. 14 which shows the correspondence between the user attribute and the interpolation ID.

Next, the second ID obtaining unit (the visible light ID reception unit B0105) obtains the visible light ID (the second ID) through the visible light communication (SB3202).

At the end, the information obtaining unit (the inquiry ID generation unit B0104) obtains information corresponding to the inquiry ID (the third ID) which is a combination of the interpolation ID (the first ID) and the visible light ID (the second ID) (SB3003). For example, the information obtaining unit generates the inquiry ID (the third ID) which is a combination of the interpolation ID (the first ID) and the visible light ID (the second ID), and obtains information corresponding to the inquiry ID from an external server (the ID correspondence information conversion server B0111).

It is to be noted that although these three operations are described separately here, these operations may be combined. In other words, the inquiry ID includes the visible light ID and at least one of the area ID, the first interpolation ID indicating the orientation of the receiver, and the second interpolation ID indicating the user attribute.

Furthermore, the present disclosure may be implemented as the inquiry ID generated in the above method.

Moreover, as indicated above in FIG. 25 to FIG. 27, the first ID obtaining unit obtains the first ID in a method other than the visible light communication, and the second ID obtaining unit obtains the second ID through the visible light communication in this embodiment. The information obtaining unit then obtains information corresponding to the third ID which is a combination of the first ID and the second ID. Thus, in this embodiment, the ID obtained in a method other than the visible light communication is used in addition to the ID obtained through the visible light communication so that the data amount of the ID obtained through the visible light communication can be reduced or information suitable for a user can be provided.

It is to be noted that the visible light communication is a communication method in which an imaging element (an image sensor) included in the receiver captures a subject which emits visible light corresponding to transmission information, and from an image obtained by the capturing, the transmission information is obtained. Furthermore, this transmission information indicates (identifies) the subject, for example. Details of the visible light communication method are described in Embodiment 2.

(Embodiment 2)

This embodiment describes an example of the visible light communication method which is used in the visible light communication system in the above Embodiment 1.

(Observation of Luminance of Light Emitting Unit)

Figure 28:
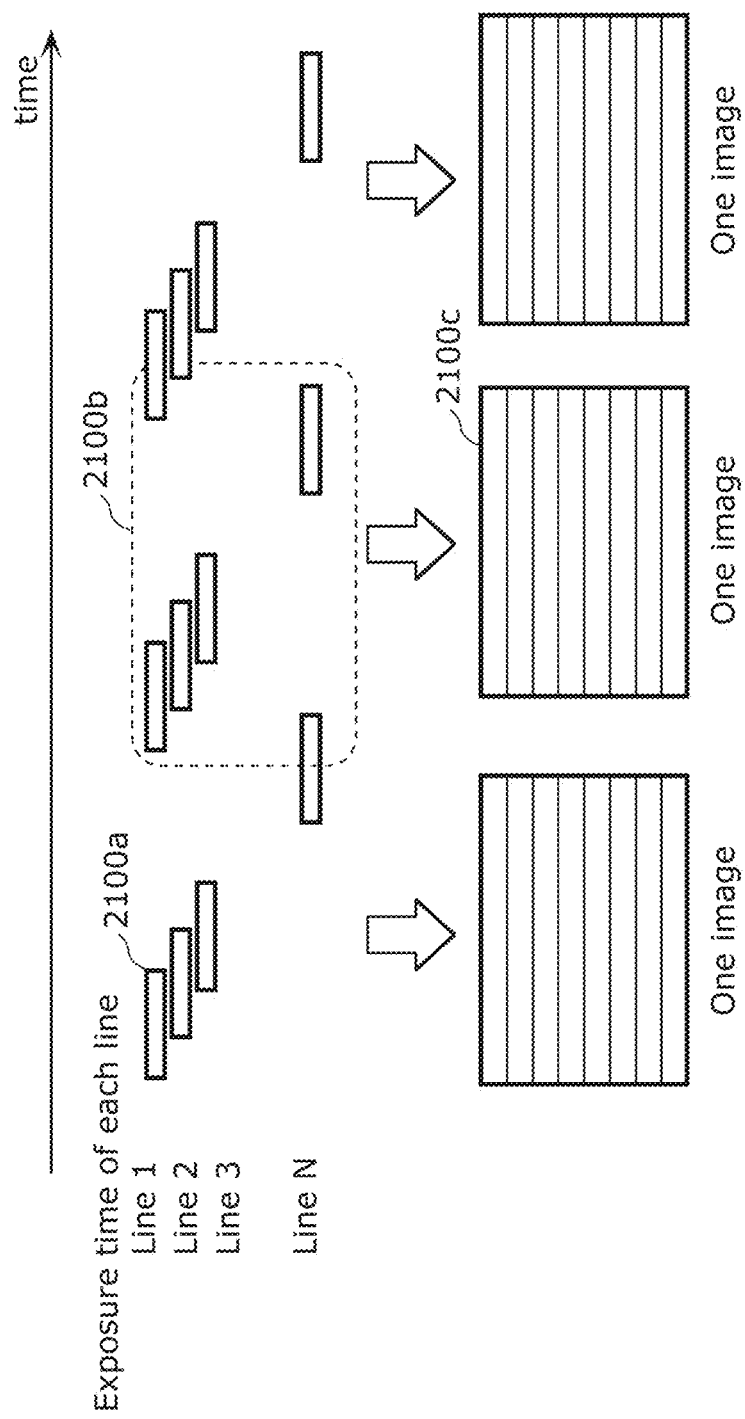
FIG. 28 illustrates an example in which imaging elements in one line are exposed at the same time and exposure start time is shifted in the order from the closest line in an imaging operation in Embodiment 2.

An imaging method is proposed in which, when one image is to be captured, the exposure starts and ends at different points in time for each imaging element Instead of exposure of all the imaging elements at the same timing. FIG. 28 illustrates an example where the imaging elements in one line are exposed at the same time, and the exposure start time is shifted in the order from the closest line in an imaging operation. Here, the imaging elements exposed at the same time are referred to as an exposure line, and a line of pixels on an image which corresponds to these imaging elements is referred to as a bright line.

Figure 29:
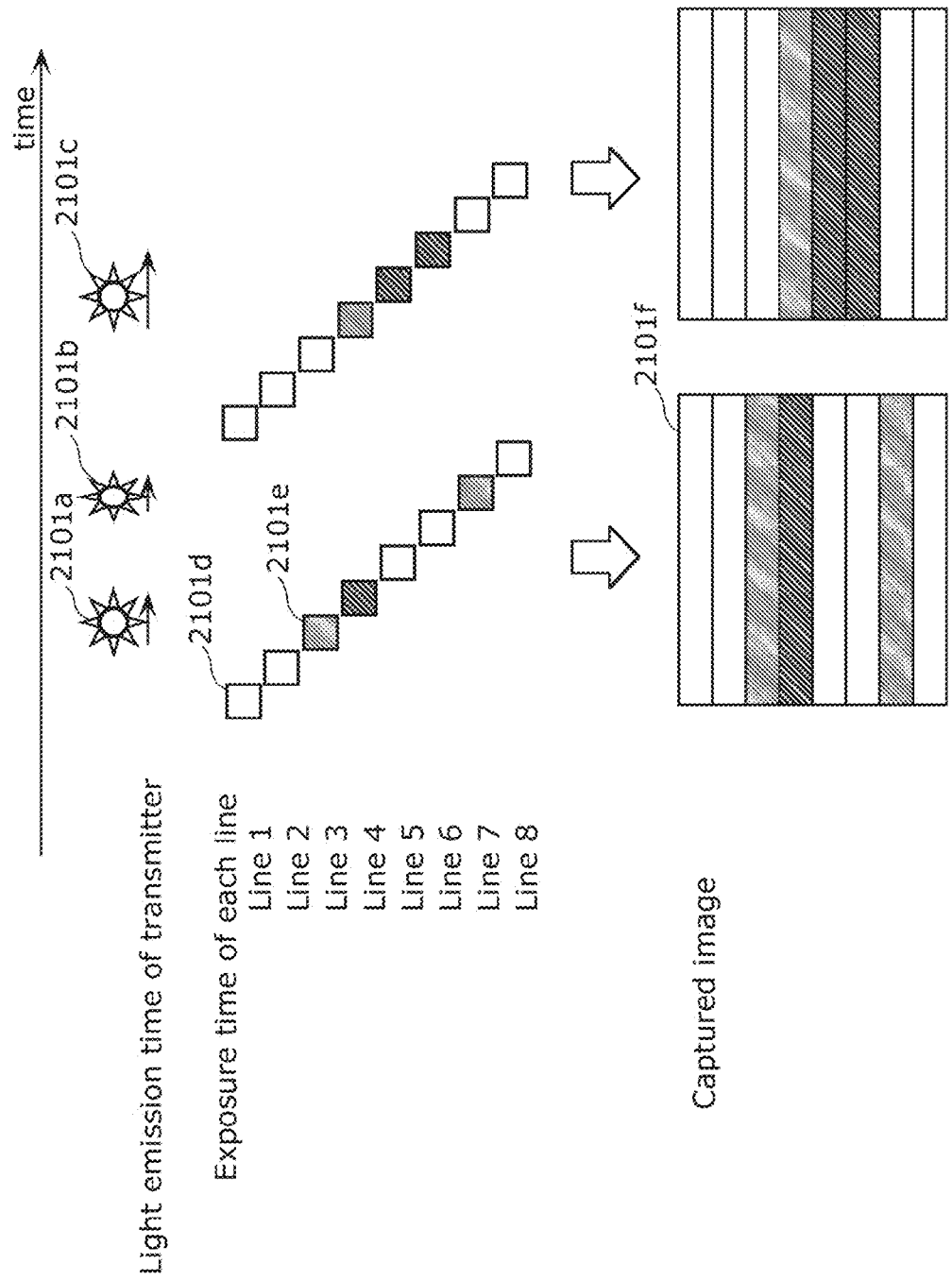
FIG. 29 illustrates a situation in which, after the exposure of one exposure line ends, the exposure of the next exposure line starts in Embodiment 2.

When an image is captured with the imaging elements the entire surfaces of which are illuminated with light from a flickering light source, a bright line (a line of brightness or darkness of pixel values) appears along an exposure line on the captured image as illustrated in FIG. 29. By recognizing this bright line pattern, it is possible to estimate a change in light source luminance at a speed which exceeds the imaging frame rate. This allows communication at a speed higher than or equal to the imaging frame rate by transmitting a signal as the change in light source luminance. In the case where the light source represents the signal with two kinds of luminance values, the lower one of the luminance values is referred to as LOW (LO), and the higher one of the luminance values is referred to as HIGH (HI). It may be that LOW is a state in which the light source emits no light or in which the light source emits light weaker than in HIGH.

By this method, information transmission is performed at the speed higher than the imaging frame rate.

In the case where the number of exposure lines whose exposure times do not overlap each other is 20 in one captured image and the imaging frame rate is 30 fps, it is possible to recognize a luminance change in a period of 1.67 millisecond. In the case where the number of exposure lines whose exposure times do not overlap each other is 1000, it is possible to recognize a luminance change in a period of 1/30000 second (about 33 microseconds). Note that the exposure time is set to less than 10 milliseconds, for example.

FIG. 29 illustrates a situation where, after the exposure of one exposure line ends, the exposure of the next exposure line starts.

In this situation, when transmitting information based on whether or not each exposure line receives at least a predetermined amount of light, information transmission at a speed of fl bits per second at the maximum can be realized where f is the number of frames per second (frame rate) and I is the number of exposure lines constituting one image.

Note that faster communication is possible in the case of performing time-difference exposure not on a line basis but on a pixel basis.

In such a case, when transmitting information based on whether or not each pixel receives at least a predetermined amount of light, the transmission speed is flm bits per second at the maximum, where m is the number of pixels per exposure line.

Figure 30:
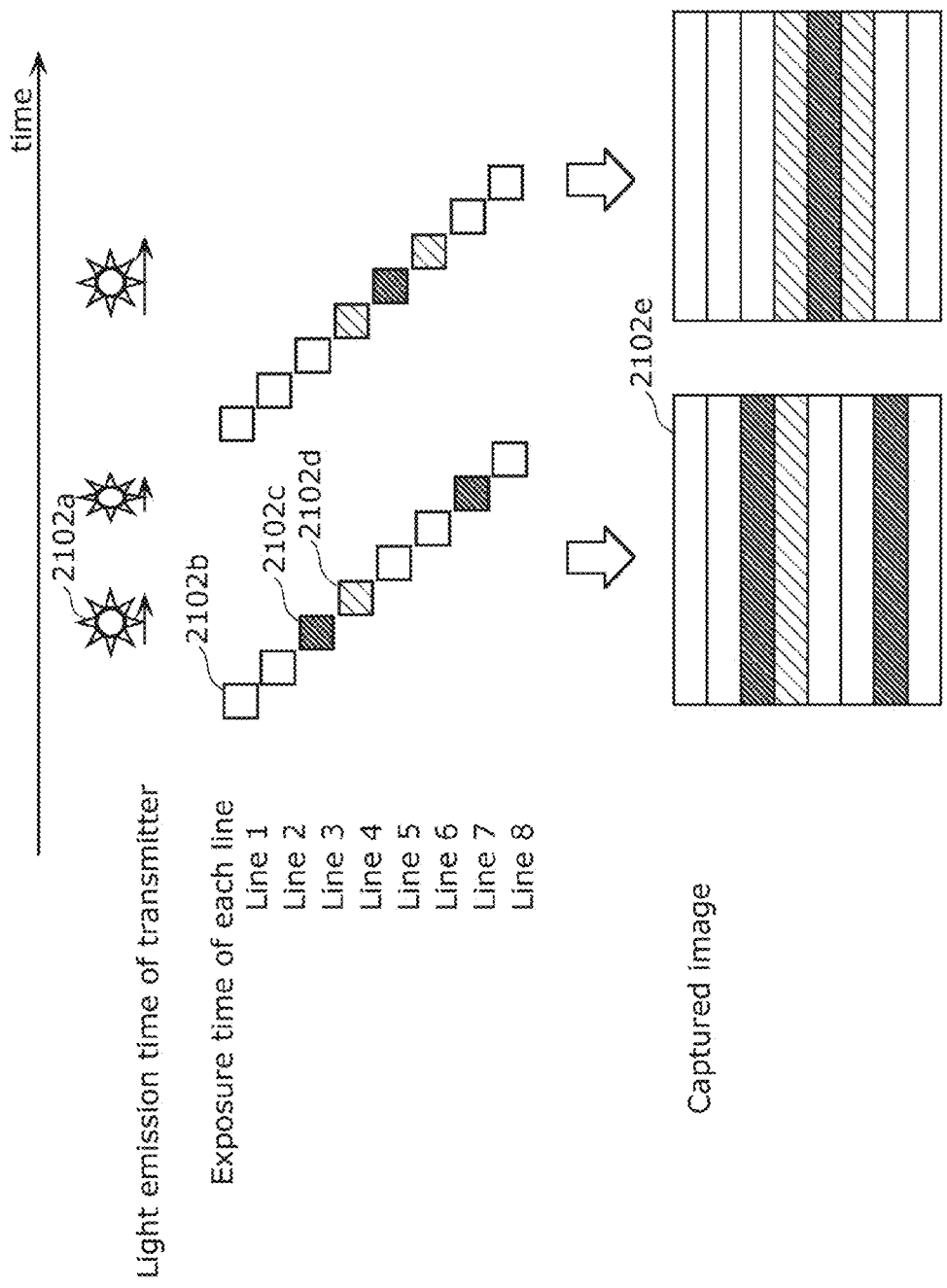
FIG. 30 illustrates a situation in which, after the exposure of one exposure line ends, the exposure of the next exposure line starts in Embodiment 2.

If the exposure state of each exposure line caused by the light emission of the light emitting unit is recognizable in a plurality of levels as illustrated in FIG. 30, more information can be transmitted by controlling the light emission time of the light emitting unit in a shorter unit of time than the exposure time of each exposure line.

In the case where the exposure state is recognizable in Elv levels, information can be transmitted at a speed of flElv bits per second at the maximum.

Moreover, a fundamental period of transmission can be recognized by causing the light emitting unit to emit light with a timing slightly different from the timing of exposure of each exposure line.

Figure 31:
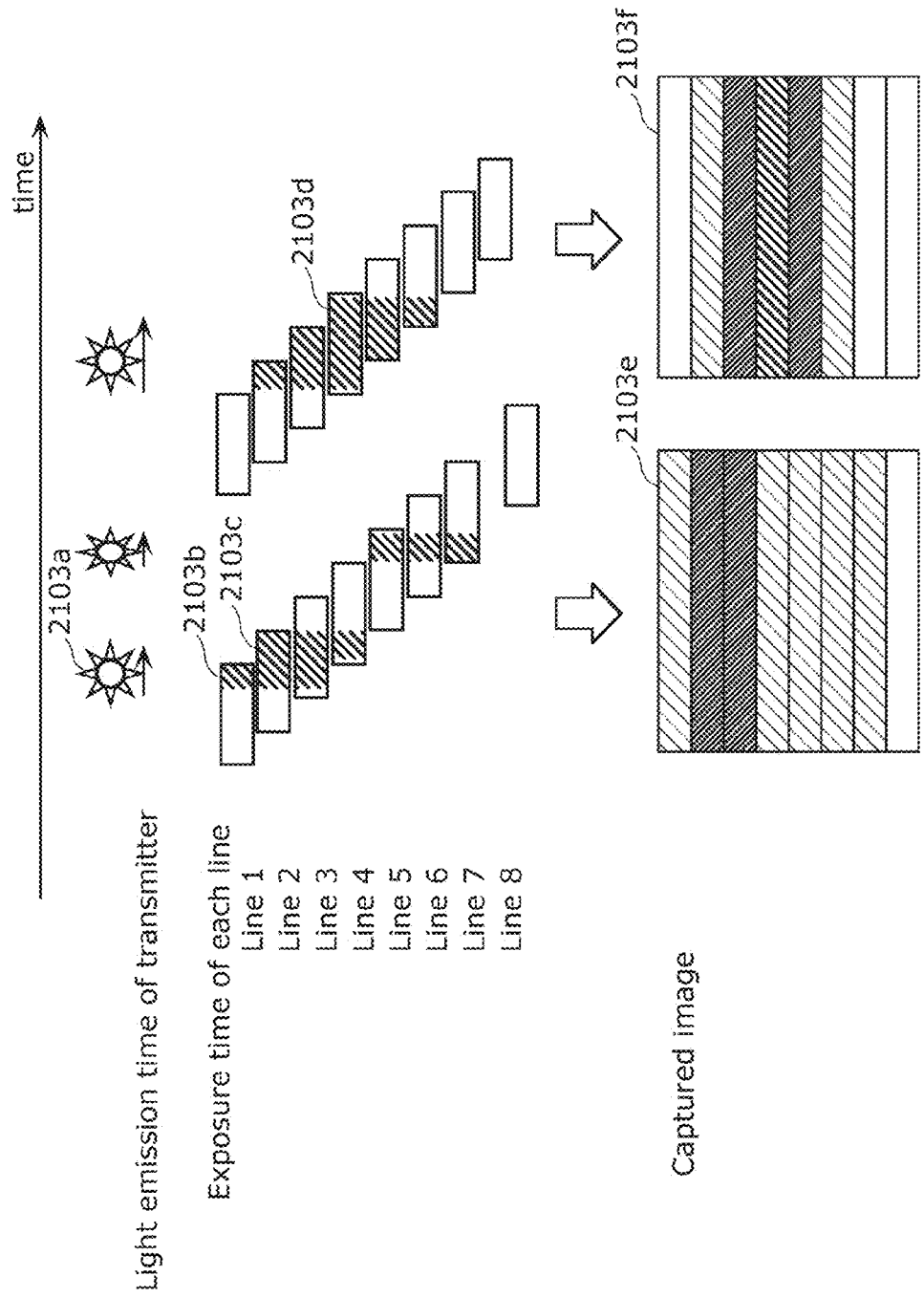
FIG. 31 illustrates a situation in which, before the exposure of one exposure line ends, the exposure of the next exposure line starts in Embodiment 2.

FIG. 31 illustrates a situation where, before the exposure of one exposure line ends, the exposure of the next exposure line starts. Specifically, this configuration is that the exposure times of adjacent exposure lines temporally partially overlap each other. With such a configuration, (1) the number of samples within a predetermined length of time can be set larger as compared to the case where it is not until the end of the exposure time of one exposure line that the exposure of the next exposure line starts. The increased number of samples within the predetermined length of time makes it possible to more appropriately detect a light signal generated by a light transmitter that is a subject. This means that the error rate in detection of the light signal can be reduced. Furthermore, (2) the exposure time of each exposure line can be set longer as compared to the case where it is not until the end of the exposure time of one exposure line that the exposure of the next exposure line starts, with the result that even in the case where the subject is dark, a brighter image can be obtained. In other words, the S/N ratio can be improved. Here, the structure in which the exposure times of adjacent exposure lines partially overlap each other does not need to be applied to all exposure lines, and part of the exposure lines may not have the structure of partially overlapping in exposure time. With the configuration in which the exposure times of part of the adjacent pairs of the exposure lines do not temporally partially overlap each other, the generation of an intermediate color due to the overlapped exposure times on the imaging screen can be reduced so that a bright line can be detected more appropriately.

In this situation, the exposure time is calculated from the brightness of each exposure line, to recognize the light emission state of the light emitting unit.

Note that, in the case of determining the brightness of each exposure line in a binary fashion of whether or not the luminance is greater than or equal to a threshold, it is necessary for the light emitting unit to continue the state of emitting no light for at least the exposure time of each line, to enable the no light emission state to be recognized.

Figure 32:
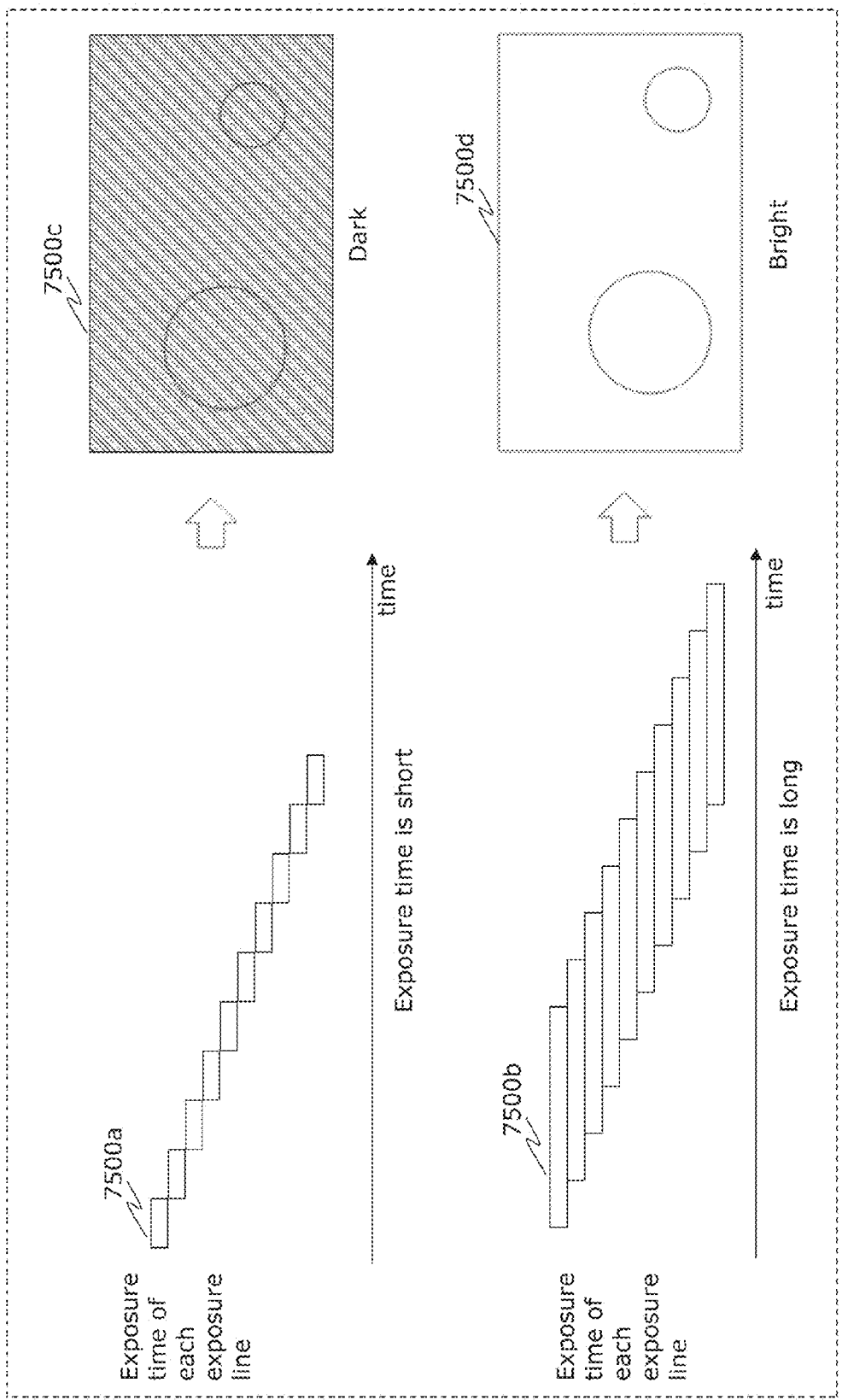
FIG. 32 illustrates the influence of a difference in exposure time in the case where the exposure start time of each exposure line is the same in Embodiment 2.

FIG. 32 illustrates the influence of the difference in exposure time in the case where the exposure start time of each exposure line is the same. In 7500a, the exposure end time of one exposure line and the exposure start time of the next exposure line are the same. In 7500b, the exposure time is longer than that in 7500a. The structure in which the exposure times of adjacent exposure lines partially overlap each other as in 7500b allows a longer exposure time to be used. That is, more light enters the imaging element, so that a brighter image can be obtained. In addition, since the imaging sensitivity for capturing an image of the same brightness can be reduced, an image with less noise can be obtained. Communication errors are prevented in this way.

Figure 33:
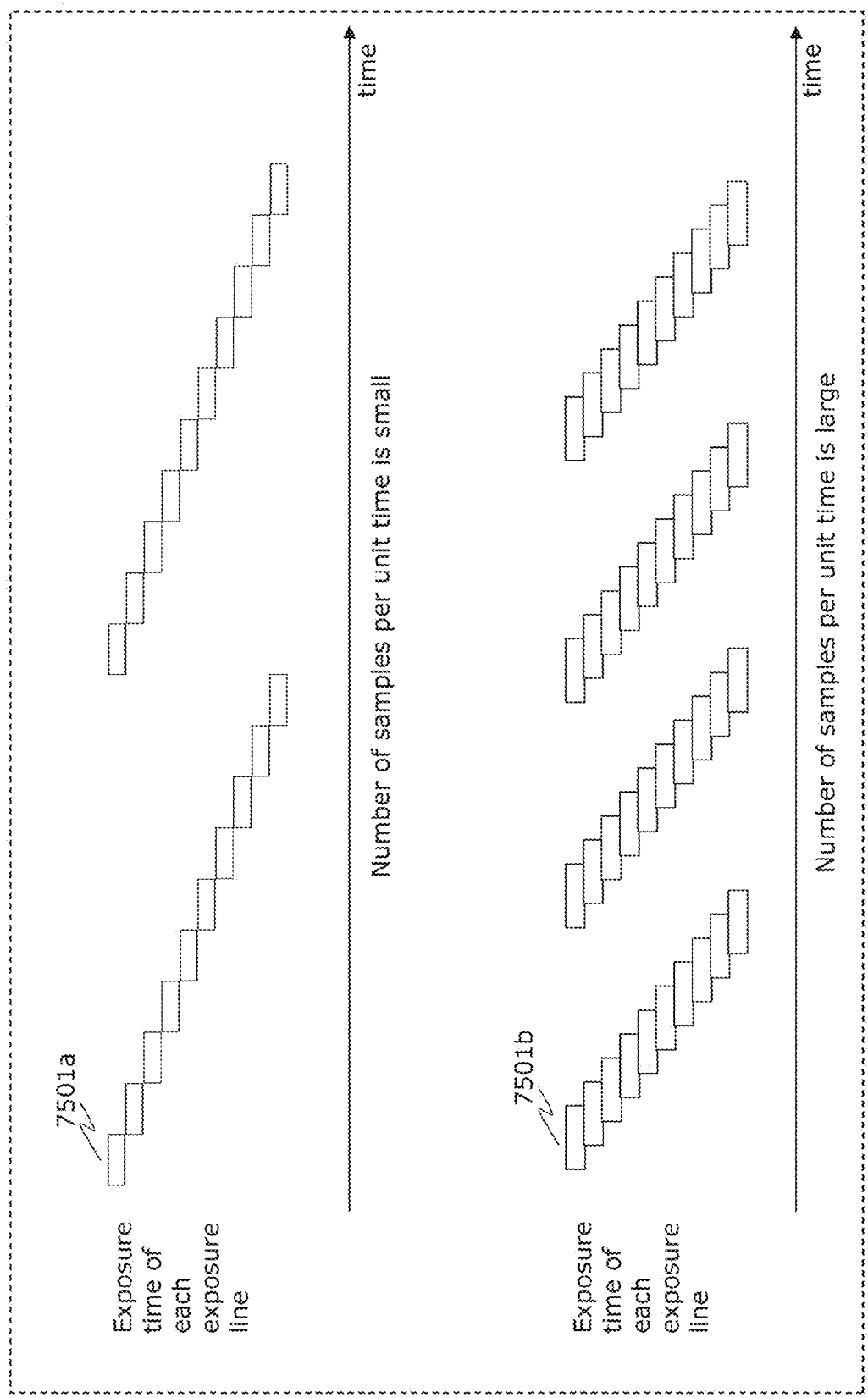
FIG. 33 illustrates the influence of a difference in exposure start time of each exposure line in the case where the exposure time is the same in Embodiment 2.

FIG. 33 illustrates the influence of the difference in exposure start time of each exposure line in the case where the exposure time is the same. In 7501a, the exposure end time of one exposure line and the exposure start time of the next exposure line are the same. In 7501b, the exposure of one exposure line ends after the exposure of the next exposure line starts. The structure in which the exposure times of adjacent exposure lines partially overlap each other as in 7501b allows more lines to be exposed per unit time. This increases the resolution, so that more information can be obtained. Since the sample interval (i.e. the difference in exposure start time) is shorter, the luminance change of the light source can be estimated more accurately, contributing to a lower error rate. Moreover, the luminance change of the light source in a shorter time can be recognized. By exposure time overlap, light source blinking shorter than the exposure time can be recognized using the difference of the amount of exposure between adjacent exposure lines.

As described with reference to FIG. 32 and FIG. 33, in the structure in which each exposure line is sequentially exposed so that the exposure times of adjacent exposure lines partially overlap each other, the communication speed can be dramatically improved by using, for signal transmission, the bright line pattern generated by setting the exposure time shorter than in the normal imaging mode. Setting the exposure time in visible light communication to less than or equal to 1/480 second enables an appropriate bright line pattern to be generated. Here, it is necessary to set (exposure time)<1/8×f, where f is the frame frequency. Blanking during imaging is half of one frame at the maximum. That is, the blanking time is less than or equal to half of the imaging time. The actual imaging time is therefore 1/2f at the shortest. Besides, since 4-value information needs to be received within the time of 1/2f, it is necessary to at least set the exposure time to less than 1/(2f×4). Given that the normal frame rate is less than or equal to 60 frames per second, by setting the exposure time to less than or equal to 1/480 second, an appropriate bright line pattern is generated in the image data and thus fast signal transmission is achieved.

Figure 34:
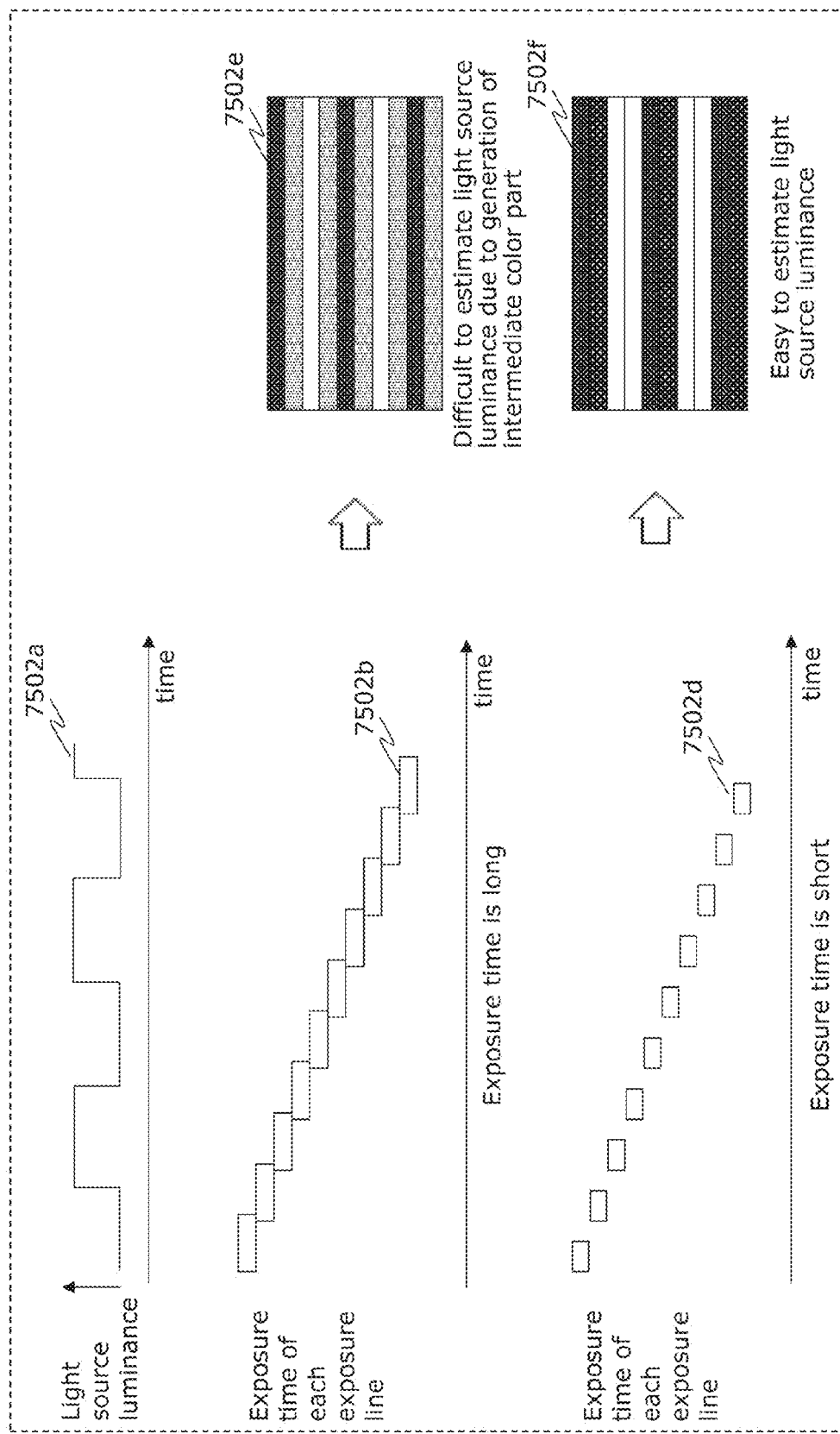
FIG. 34 illustrates the advantage of using a short exposure time in the case where each exposure line does not overlap another in exposure time in Embodiment 2.

FIG. 34 illustrates the advantage of using a short exposure time in the case where each exposure line does not overlap in exposure time. In the case where the exposure time is long, even when the light source changes in luminance in a binary fashion as in 7502a, an intermediate-color part tends to appear in the captured image as in 7502e, making it difficult to recognize the luminance change of the light source. By providing a predetermined non-exposure vacant time (predetermined wait time) $t_{D2}$ from when the exposure of one exposure line ends to when the exposure of the next exposure line starts as in 7502d, however, the luminance change of the light source can be recognized more easily. That is, a more appropriate bright line pattern can be detected as in 7502f. The provision of the predetermined non-exposure vacant time is possible by setting a shorter exposure time $t_E$ than the time difference $t_D$ between the exposure start times of the exposure lines, as in 7502d. In the case where the exposure times of adjacent exposure lines partially overlap each other in the normal imaging mode, the exposure time is shortened from the normal imaging mode so as to provide the predetermined non-exposure vacant time. In the case where the exposure end time of one exposure line and the exposure start time of the next exposure line are the same in the normal imaging mode, too, the exposure time is shortened so as to provide the predetermined non-exposure time. Alternatively, the predetermined non-exposure vacant time (predetermined wait time) $t_{D2}$ from when the exposure of one exposure line ends to when the exposure of the next exposure line starts may be provided by increasing the interval $t_D$ between the exposure start times of the exposure lines, as in 7502g. This structure allows a longer exposure time to be used, so that a brighter image can be captured. Moreover, a reduction in noise contributes to higher error tolerance. Meanwhile, this structure is disadvantageous in that the number of samples is small as in 7502h, because fewer exposure lines can be exposed in a predetermined time. Accordingly, it is desirable to use these structures depending on circumstances. For example, the estimation error of the luminance change of the light source can be reduced by using the former structure in the case where the imaging object is bright and using the latter structure in the case where the imaging object is dark.

Here, the structure in which the exposure times of adjacent exposure lines partially overlap each other does not need to be applied to all exposure lines, and part of the exposure lines may not have the structure of partially overlapping in exposure time. Moreover, the structure in which the predetermined non-exposure vacant time (predetermined wait time) is provided from when the exposure of one exposure line ends to when the exposure of the next exposure line starts does not need to be applied to all exposure lines, and part of the exposure lines may have the structure of partially overlapping in exposure time. This makes it possible to take advantage of each of the structures. Furthermore, the same reading method or circuit may be used to read a signal in the normal imaging mode in which imaging is performed at the normal frame rate (30 fps, 60 fps) and the visible light communication mode in which imaging is performed with the exposure time less than or equal to 1/480 second for visible light communication. The use of the same reading method or circuit to read a signal eliminates the need to employ separate circuits for the normal imaging mode and the visible light communication mode. The circuit size can be reduced in this way.

Figure 35:
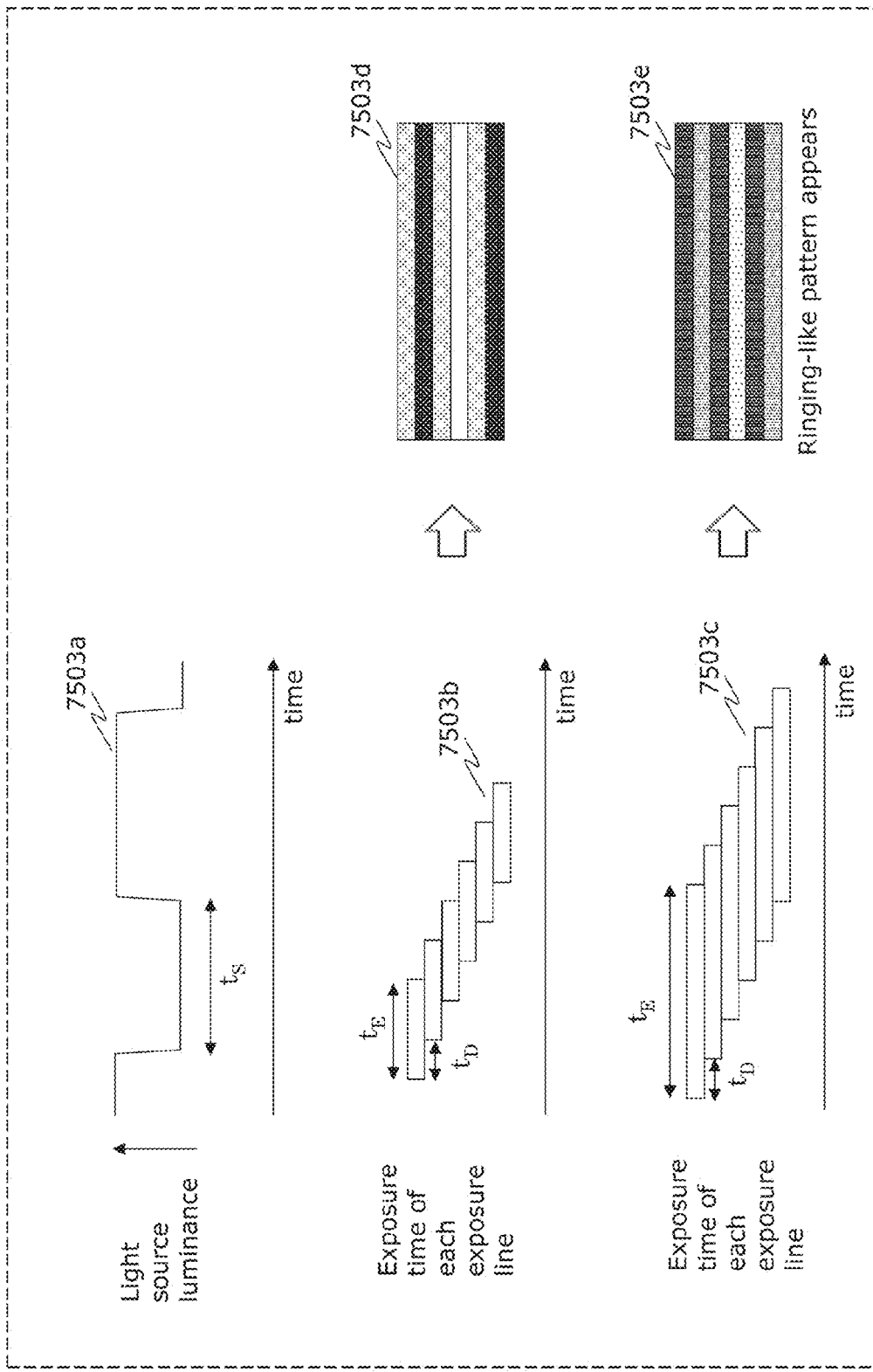
FIG. 35 illustrates the relation between the minimum change time of light source luminance, the exposure time, the time difference between the exposure start times of the exposure lines, and the captured image in Embodiment 2.

FIG. 35 illustrates the relation between the minimum change time $t_S$ of light source luminance, the exposure time $t_E$, the time difference $t_D$ between the exposure start times of the exposure lines, and the captured image. In the case where $t_E+t_D<t_S$, imaging is always performed in a state where the light source does not change from the start to end of the exposure of at least one exposure line. As a result, an image with clear luminance is obtained as in 7503d, from which the luminance change of the light source is easily recognizable. In the case where $2t_E>t_S$, a bright line pattern different from the luminance change of the light source might be obtained, making it difficult to recognize the luminance change of the light source from the captured image.

Figure 36:
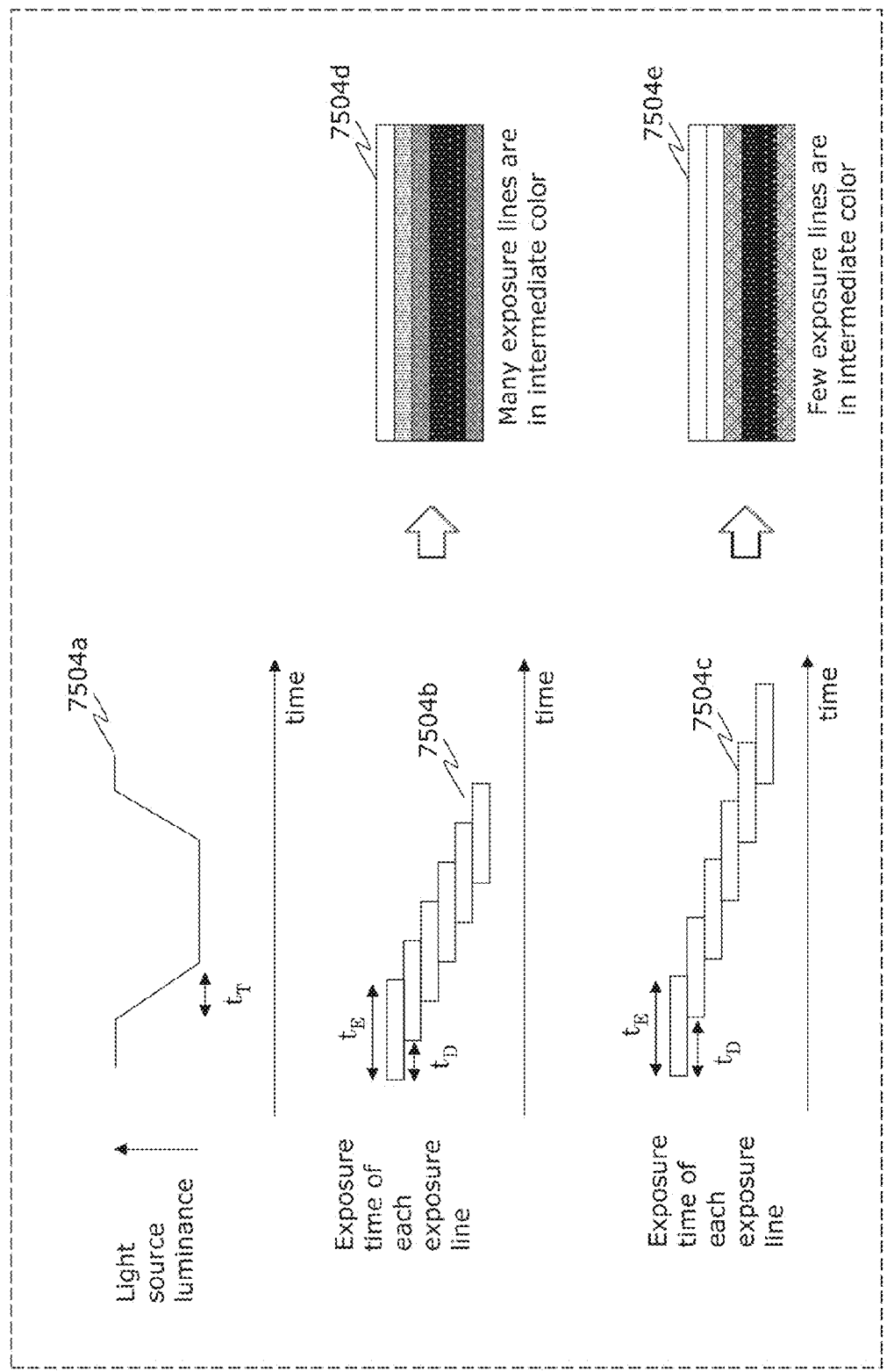
FIG. 36 illustrates the relation between the transition time of light source luminance and the time difference between the exposure start times of the exposure lines in Embodiment 2.

FIG. 36 illustrates the relation between the transition time $t_T$ of light source luminance and the time difference $t_D$ between the exposure start times of the exposure lines. When $t_D$ is large as compared with $t_T$, fewer exposure lines are in the intermediate color, which facilitates estimation of light source luminance. It is desirable that $t_D > t_T$, because the number of exposure lines in the intermediate color is two or less consecutively. Since $t_T$ is less than or equal to 1 microsecond in the case where the light source is an LED and about 5 microseconds in the case where the light source is an organic EL device, setting $t_D$ to greater than or equal to 5 microseconds facilitates estimation of light source luminance.

Figure 37:
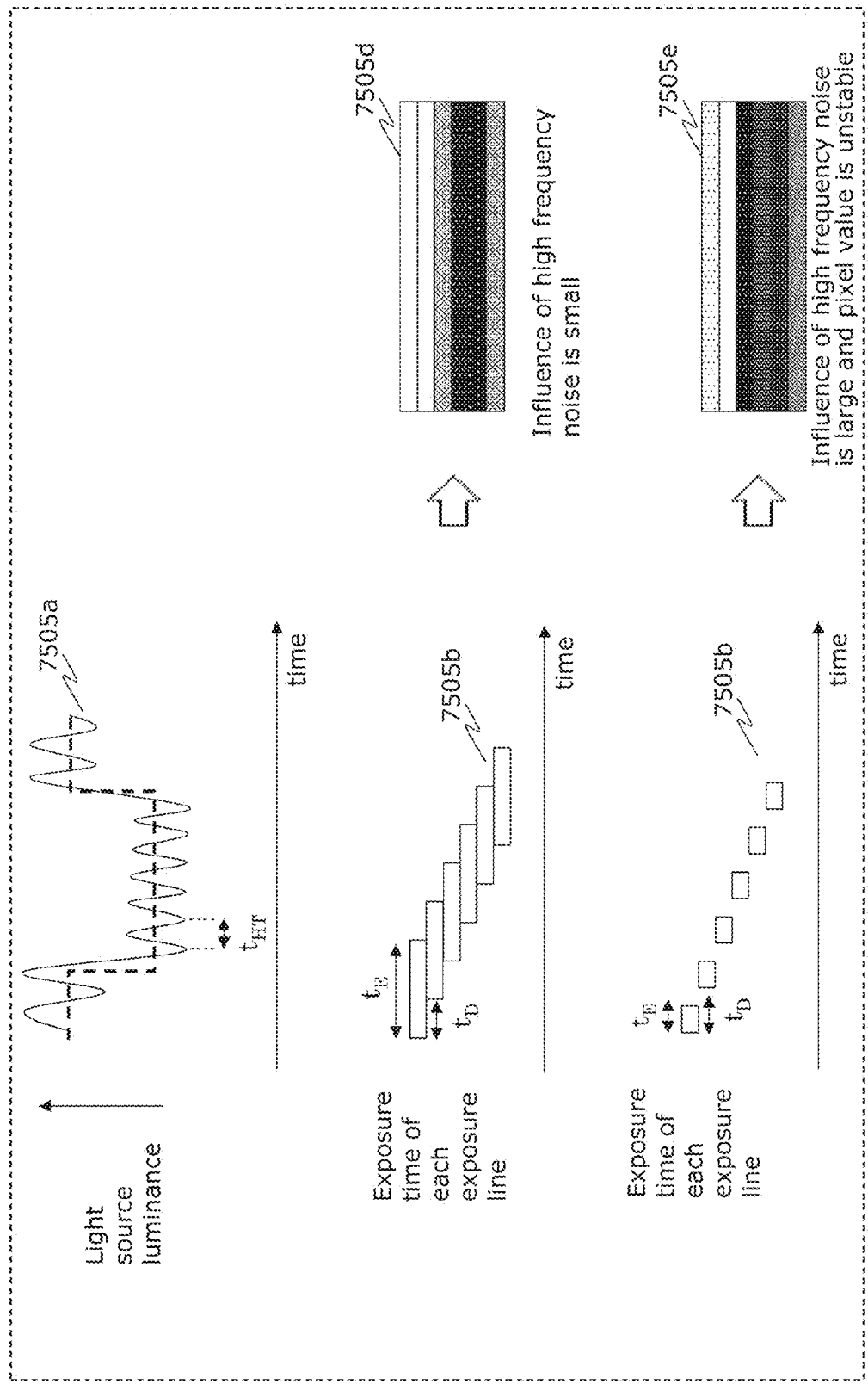
FIG. 37 illustrates the relation between high frequency noise of light source luminance and the exposure time in Embodiment 2.

FIG. 37 illustrates the relation between the high frequency noise $t_{HT}$ of light source luminance and the exposure time $t_E$. When $t_E$ is large as compared with $t_{HT}$, the captured image is less influenced by high frequency noise, which facilitates estimation of light source luminance. When $t_E$ is an integral multiple of $t_{HT}$, there is no influence of high frequency noise, and estimation of light source luminance is easiest. For estimation of light source luminance, it is desirable that $t_E > t_{HT}$. High frequency noise is mainly caused by a switching power supply circuit. Since $t_{HT}$ is less than or equal to 20 microseconds in many switching power supplies for lightings, setting $t_E$ to greater than or equal to 20 microseconds facilitates estimation of light source luminance.

Figure 38:
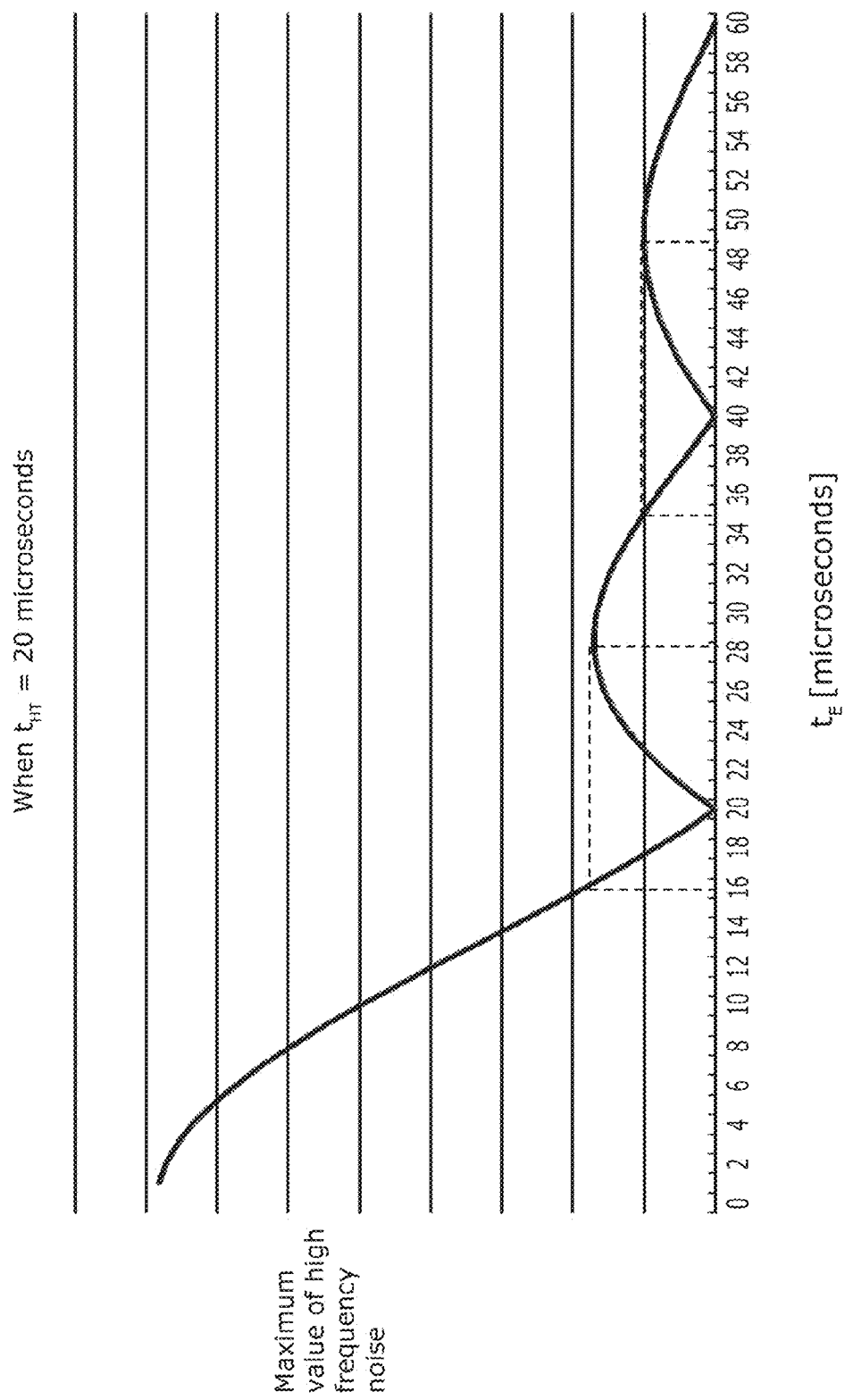
FIG. 38 is a graph representing the relation between the exposure time and the magnitude of high frequency noise of light source luminance when the high frequency noise is 20 microseconds in Embodiment 2.

FIG. 38 is a graph representing the relation between the exposure time $t_E$ and the magnitude of high frequency noise when the high frequency noise $t_{HT}$ of light source luminance is 20 microseconds. Given that $t_{HT}$ varies depending on the light source, the graph demonstrates that it is efficient to set $t_E$ to greater than or equal to 15 microseconds, greater than or equal to 35 microseconds, greater than or equal to 54 microseconds, or greater than or equal to 74 microseconds, each of which is a value equal to the value when the amount of noise is at the maximum. Though $t_E$ is desirably larger in terms of high frequency noise reduction, there is also the above-mentioned property that, when $t_E$ is smaller, an intermediate-color part is less likely to occur and estimation of light source luminance is easier. Therefore, $t_E$ may be set to greater than or equal to 15 microseconds when the light source luminance change period is 15 to 35 microseconds, to greater than or equal to 35 microseconds when the light source luminance change period is 35 to 54 microseconds, to greater than or equal to 54 microseconds when the light source luminance change period is 54 to 74 microseconds, and to greater than or equal to 74 microseconds when the light source luminance change period is greater than or equal to 74 microseconds.

Figure 39:
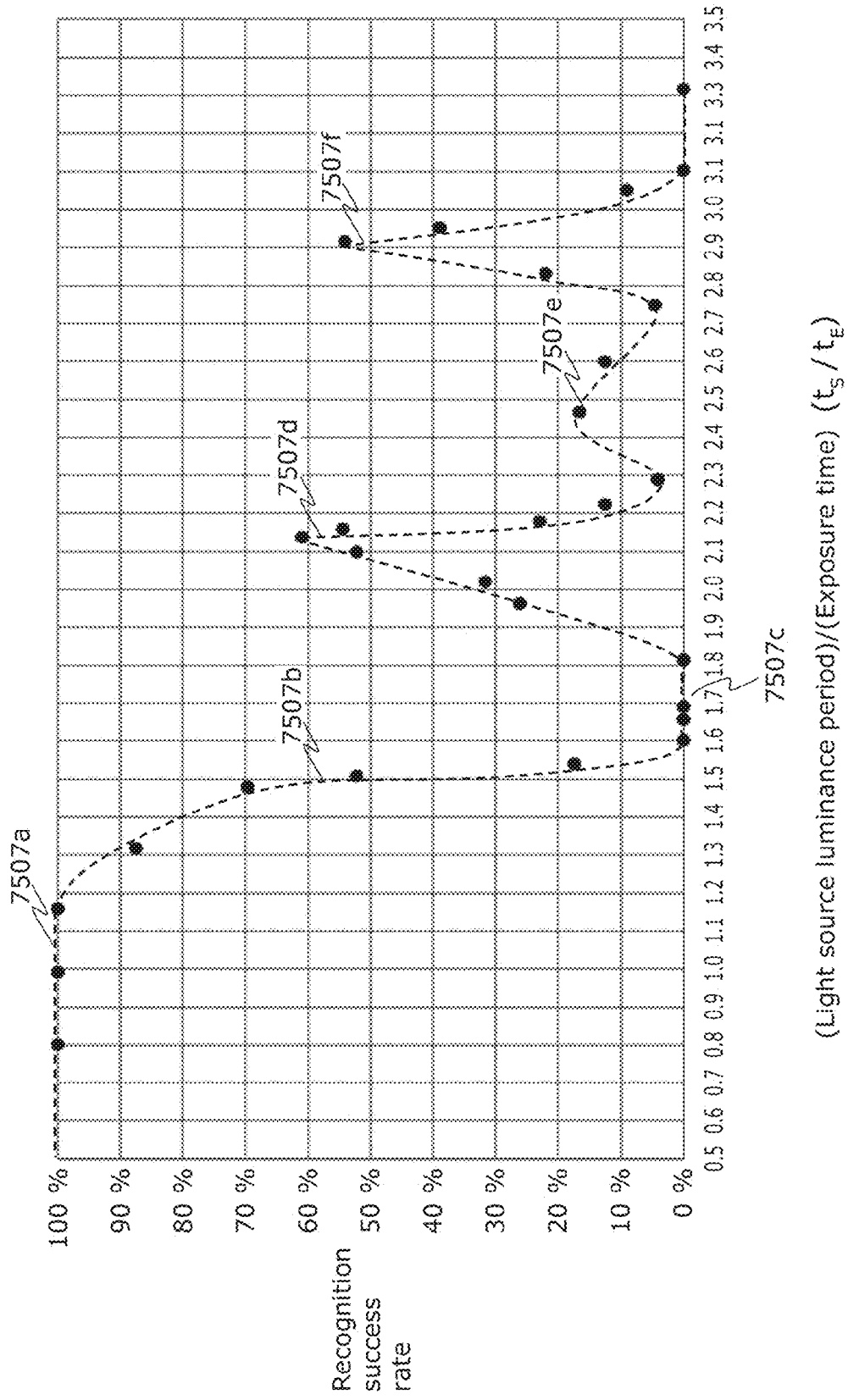
FIG. 39 illustrates the relation between the exposure time $t_E$ and the recognition success rate in Embodiment 2.
Figure 40:
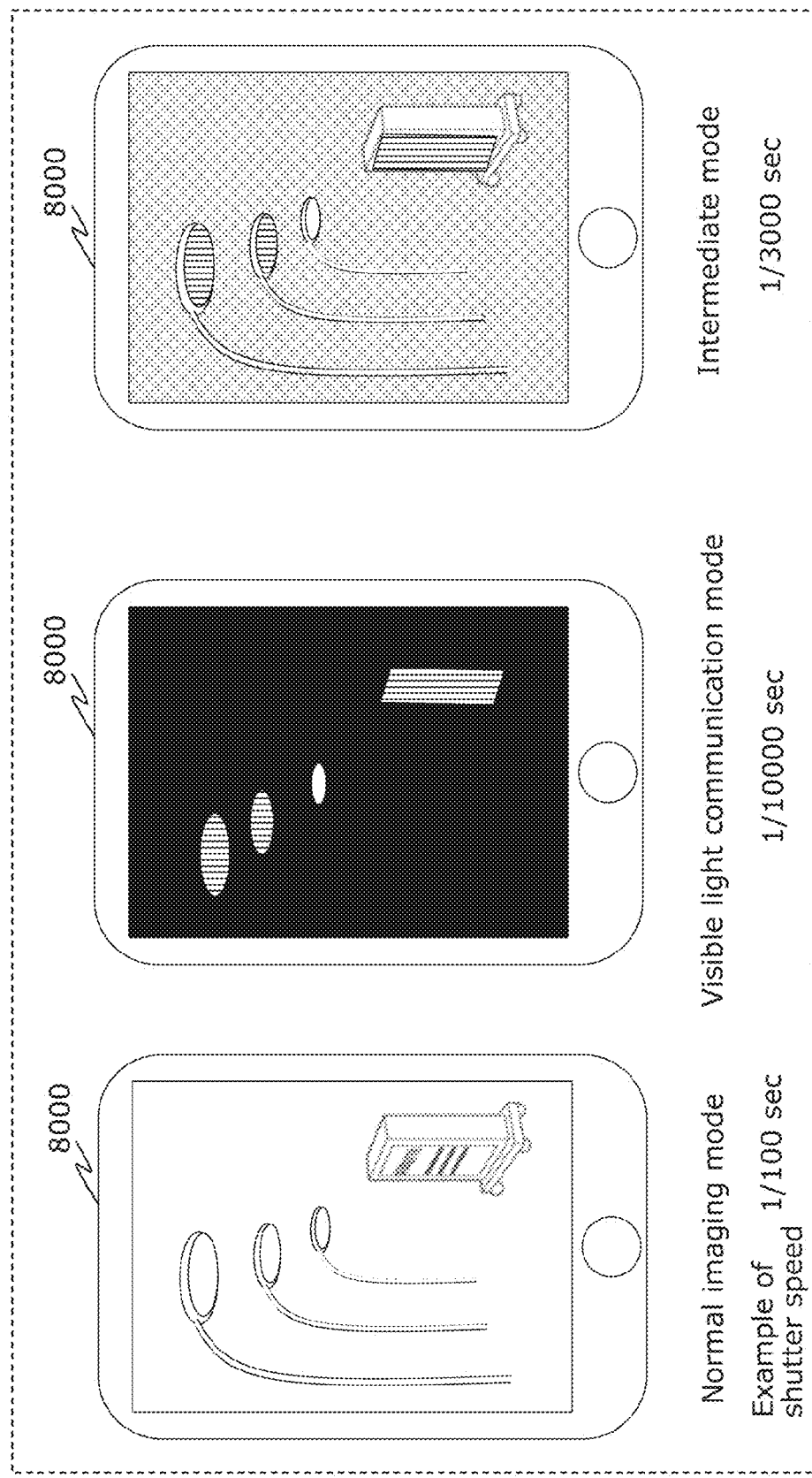
FIG. 40 illustrates an example of each mode of a receiver in Embodiment 2.

FIG. 39 illustrates the relation between the exposure time $t_E$ and the recognition success rate. Since the exposure time $t_E$ is relative to the time during which the light source luminance is constant, the horizontal axis represents the value (relative exposure time) obtained by dividing the light source luminance change period $t_S$ by the exposure time $t_E$. It can be understood from the graph that the recognition success rate of approximately 100% can be attained by setting the relative exposure time to less than or equal to 1.2. For example, the exposure time may be set to less than or equal to approximately 0.83 millisecond in the case where the transmission signal is 1 kHz. Likewise, the recognition success rate greater than or equal to 95% can be attained by setting the relative exposure time to less than or equal to 1.25, and the recognition success rate greater than or equal to 80% can be attained by setting the relative exposure time to less than or equal to 1.4. Moreover, since the recognition success rate sharply decreases when the relative exposure time is about 1.5 and becomes roughly 0% when the relative exposure time is 1.6, it is necessary to set the relative exposure time not to exceed 1.5. After the recognition rate becomes 0% at 7507c, it increases again at 7507d, 7507e, and 7507f. Accordingly, for example to capture a bright image with a longer exposure time, the exposure time may be set so that the relative exposure time is 1.9 to 2.2, 2.4 to 2.6, or 2.8 to 3.0. Such an exposure time may be used, for instance, as an intermediate mode in FIG. 40.

Figure 41:
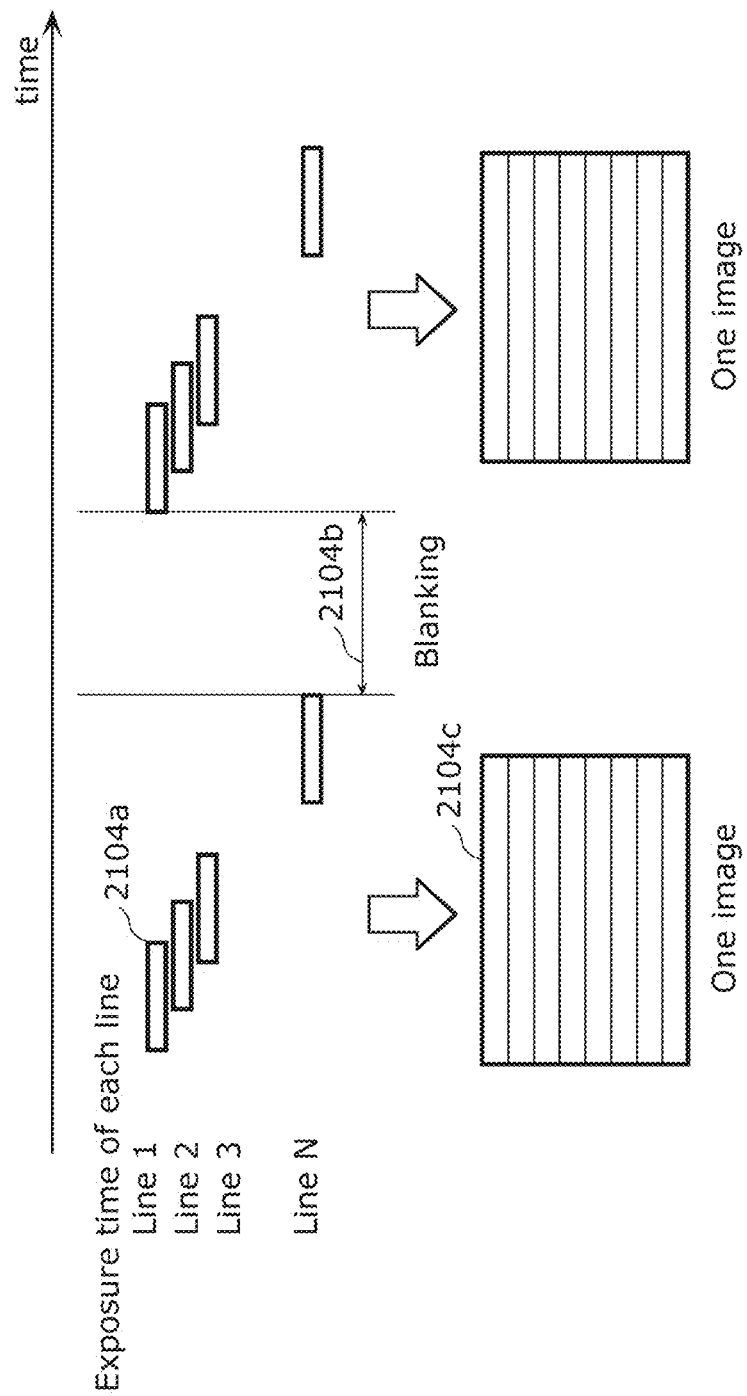
FIG. 41 illustrates an example of an observation method of luminance of a light emitting unit in Embodiment 2.

Depending on imaging devices, there is a time (blanking) during which no exposure is performed, as illustrated in FIG. 41.

In the case where there is blanking, the luminance of the light emitting unit during the time cannot be observed.

A transmission loss caused by blanking can be prevented by the light emitting unit repeatedly transmitting the same signal two or more times or adding error correcting code.

To prevent the same signal from being transmitted during blanking every time, the light emitting unit transmits the signal in a period that is relatively prime to the period of image capture or a period that is shorter than the period of image capture.

(Embodiment 3)

Figure 42:
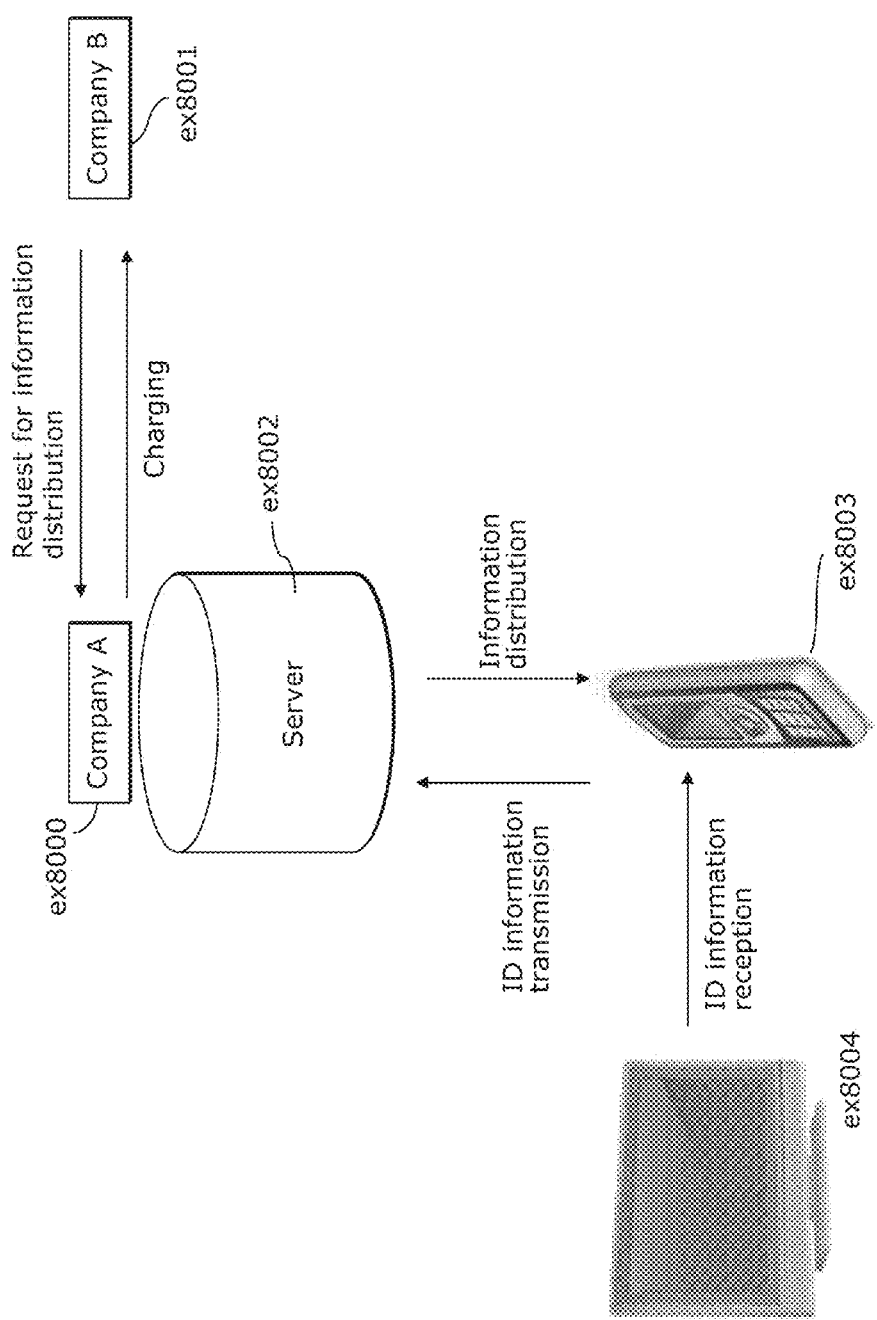
FIG. 42 illustrates a service provision system in Embodiment 3.

FIG. 42 illustrates a service provision system using the reception method described in any of the foregoing embodiments.

First, a company A ex8000 managing a server ex8002 is requested to distribute information to a mobile terminal, by another company B or individual ex8001. For example, the distribution of detailed advertisement information, coupon information, map information, or the like to the mobile terminal that performs visible light communication with a signage is requested. The company A ex8000 managing the server manages information distributed to the mobile terminal in association with arbitrary ID information. A mobile terminal ex8003 obtains ID information from a subject ex8004 by visible light communication, and transmits the obtained ID information to the server ex8002. The server ex8002 transmits the information corresponding to the ID information to the mobile terminal, and counts the number of times the information corresponding to the ID information is transmitted. The company A ex8000 managing the server charges the fee corresponding to the count, to the requesting company B or individual ex8001. For example, a larger fee is charged when the count is larger.

Figure 43:
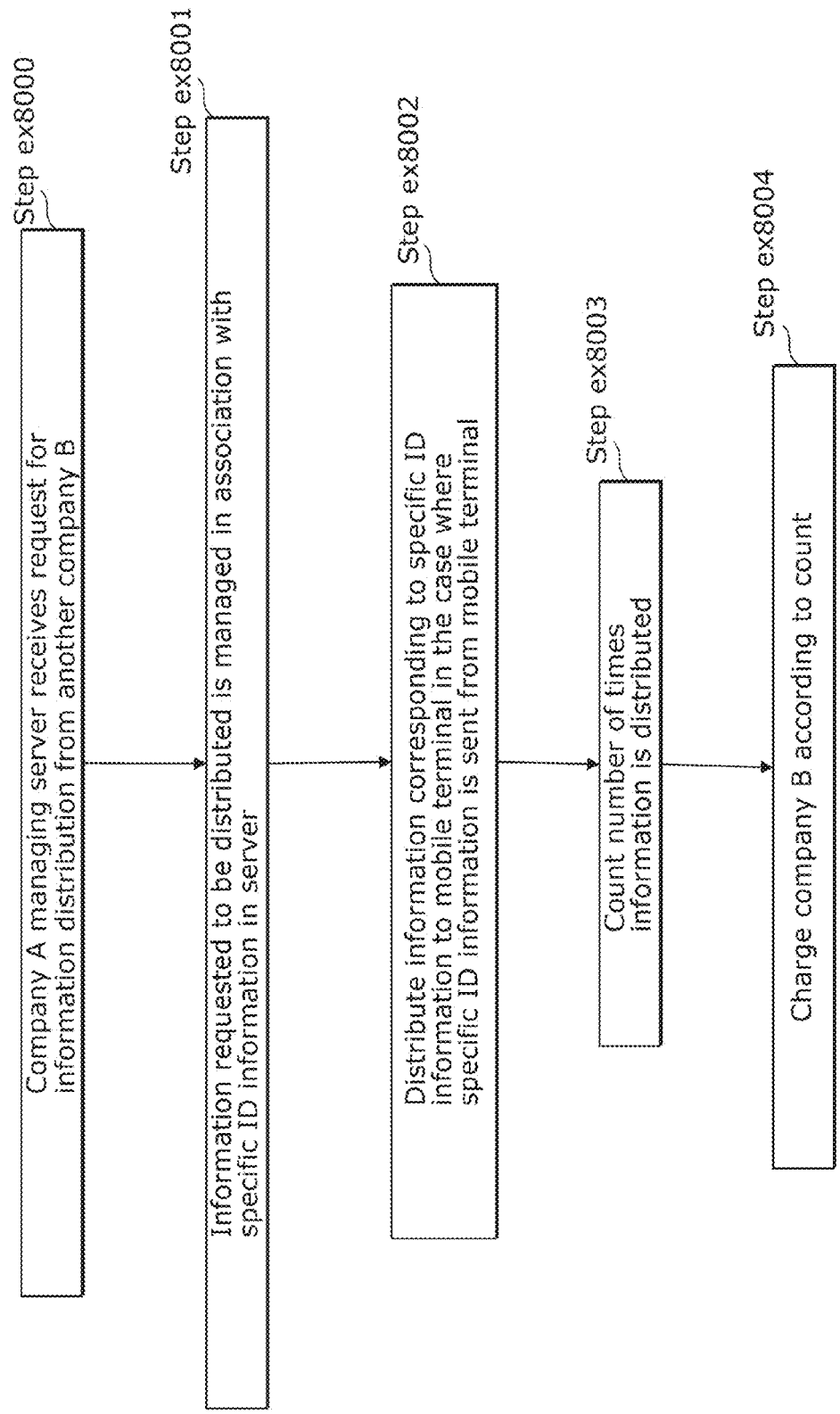
FIG. 43 is a flowchart of service provision in Embodiment 3.

FIG. 43 is a flowchart illustrating service provision flow.

In Step ex8000, the company A managing the server receives the request for information distribution from another company B. In Step ex8001, the information requested to be distributed is managed in association with the specific ID information in the server managed by the company A. In Step ex8002, the mobile terminal receives the specific ID information from the subject by visible light communication, and transmits it to the server managed by the company A. The visible light communication method has already been described in detail in the other embodiments, and so its description is omitted here. The server transmits the information corresponding to the specific ID information received from the mobile terminal, to the mobile terminal. In Step ex8003, the number of times the information is distributed is counted in the server. Lastly, in Step ex8004, the fee corresponding to the information distribution count is charged to the company B. By such charging according to the count, the appropriate fee corresponding to the advertising effect of the information distribution can be charged to the company B.

Figure 44:
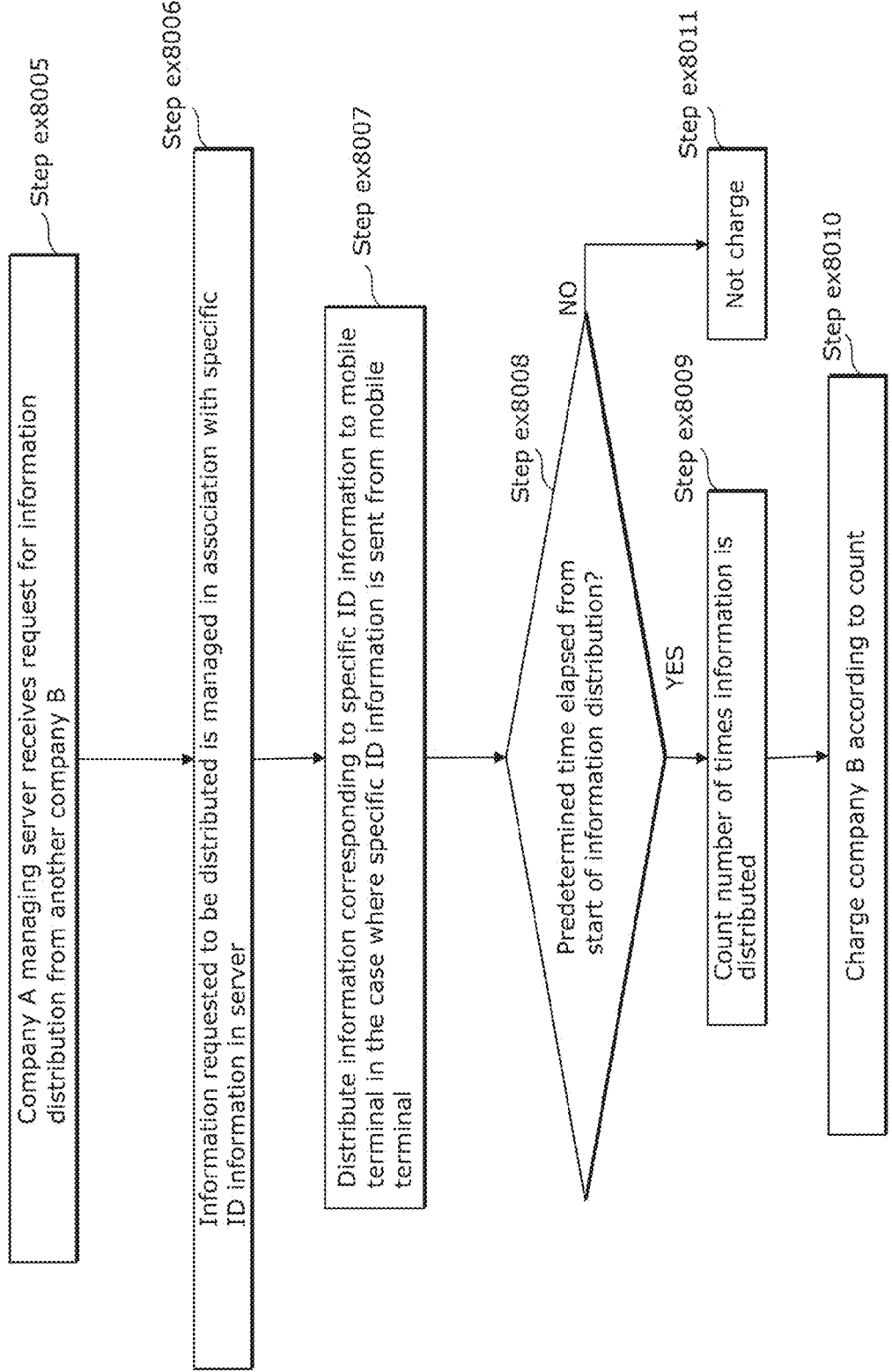
FIG. 44 is a flowchart of the service provision in another example of Embodiment 3.

FIG. 44 is a flowchart illustrating service provision flow in another example. The description of the same steps as those in FIG. 43 is omitted here.

In Step ex8008, whether or not a predetermined time has elapsed from the start of the information distribution is determined. In the case of determining that the predetermined time has not elapsed, no fee is charged to the company B in Step ex8011. In the case of determining that the predetermined time has elapsed, the number of times the information is distributed is counted in Step ex8009. In Step ex8010, the fee corresponding to the information distribution count is charged to the company B. Since the information distribution is performed free of charge within the predetermined time, the company B can receive the accounting service after checking the advertising effect and the like.

Figure 45:
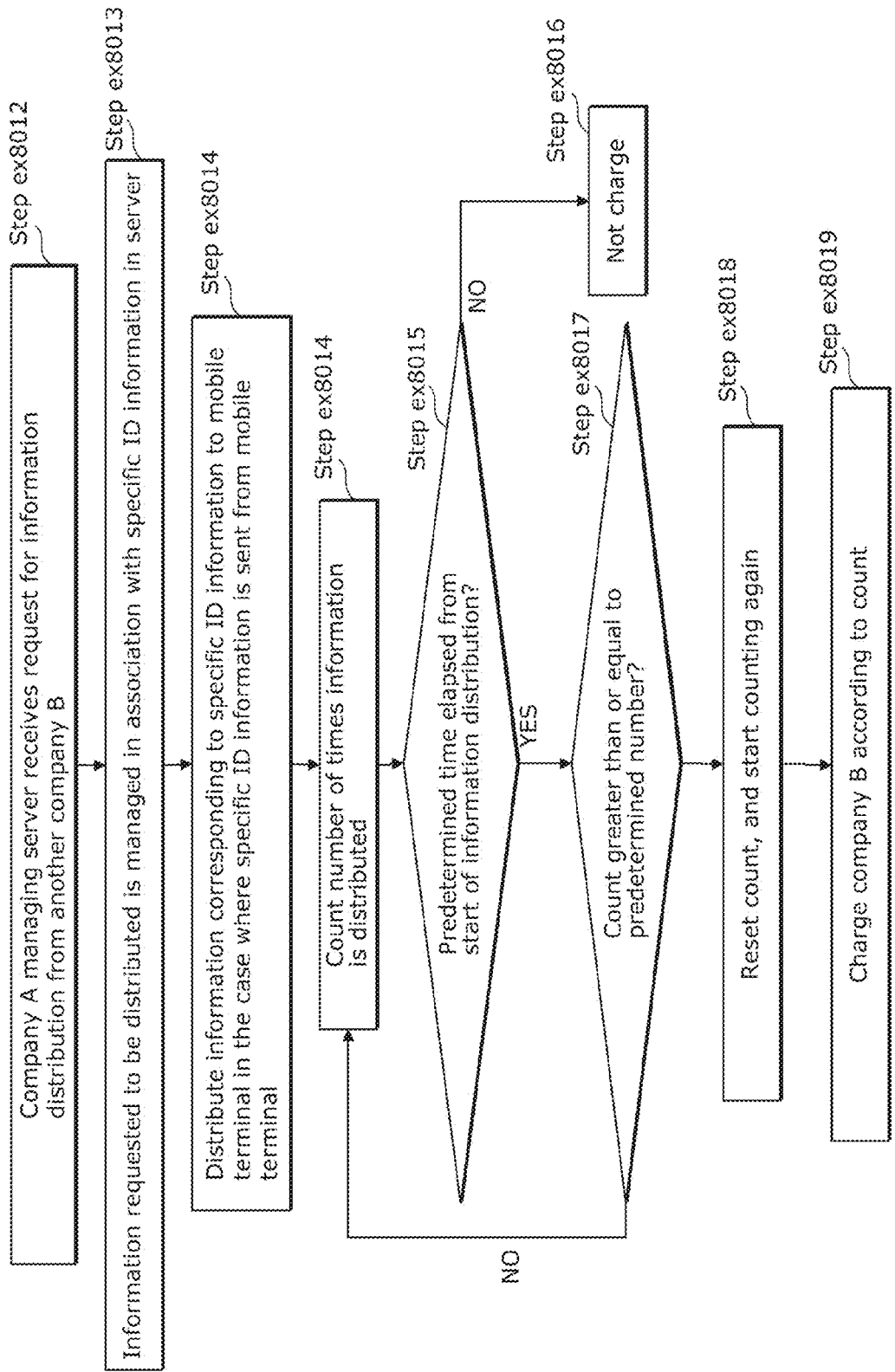
FIG. 45 is a flowchart of the service provision in another example of Embodiment 3.

FIG. 45 is a flowchart illustrating service provision flow in another example. The description of the same steps as those in FIG. 44 is omitted here.

In Step ex8014, the number of times the information is distributed is counted in the server. In the case of determining that the predetermined time has not elapsed from the start of the information distribution in Step ex8015, no fee is charged in Step ex8016. In the case of determining that the predetermined time has elapsed, on the other hand, whether or not the number of times the information is distributed is greater than or equal to a predetermined number is determined in Step ex8017. In the case where the number of times the information is distributed is less than the predetermined number, the count is reset, and the number of times the information is distributed is counted again. In this case, no fee is charged to the company B regarding the predetermined time during which the number of times the information is distributed is less than the predetermined number. In the case where the count is greater than or equal to the predetermined number in Step ex8017, the count is reset and started again in Step ex8018. In Step ex8019, the fee corresponding to the Information distribution count is charged to the company B. Thus, in the case where the count during the free distribution time is small, the free distribution time is provided again. This enables the company B to receive the accounting service at an appropriate time. Moreover, in the case where the count is small, the company A can analyze the information and, for example when the information is out of season, suggest the change of the information to the company B. In the case where the free distribution time is provided again, the time may be shorter than the predetermined time provided first. The shorter time than the predetermined time provided first reduces the burden on the company A. Further, the free distribution time may be provided again after a fixed time period. For instance, if the information is influenced by seasonality, the free distribution time is provided again after the fixed time period until the new season begins.

Note that the charge fee may be changed according to the amount of data, regardless of the number of times the information is distributed. Distribution of a predetermined amount of data or more may be charged, while distribution is free of charge within the predetermined amount of data. The charge fee may be increased with the increase of the amount of data. Moreover, when managing the Information in association with the specific ID information, a management fee may be charged. By charging the management fee, it is possible to determine the fee upon requesting the information distribution.

Although the display apparatus, the receiver, and the visible light communication system according to the embodiments in the present disclosure have been described above, these embodiments do not restrict the present disclosure.

Moreover, the respective processing units included in the display apparatus, the receiver, or the visible light communication system according to the above embodiments are each typically implemented as an LSI which is an integrated circuit. These processing units may be individually configured as single chips or may be configured so that a part or all of the processing units are included in a single chip.

Furthermore, the method of circuit integration is not limited to LSIs, and implementation through a dedicated circuit or a genera-purpose processor is also possible. A Field Programmable Gate Array (FPGA) which allows programming after LSI manufacturing or a reconfigurable processor which allows reconfiguration of the connections and settings of the circuit cells inside the LSI may also be used.

Furthermore, each of the structural elements in each of the above-described embodiments may be configured in the form of an exclusive hardware product, or may be realized by executing a software program suitable for the structural element. Each of the structural elements may be realized by means of a program executing unit, such as a CPU or a processor, reading and executing the software program recorded in a recording medium such as a hard disk or a semiconductor memory.

Moreover, the present disclosure may be implemented as the above program, or may be implemented as a non-transitory computer-readable recording medium on which the above program has been recorded. Furthermore, it goes without saying that the program can be distributed via a transmission medium such as the Internet.

Moreover, all numerical figures used in the forgoing description are exemplified for describing the present disclosure in specific terms, and thus the present disclosure is not limited to the exemplified numerical figures. Furthermore, the logic levels represented as HIGH and LOW or switching states represented as ON and OFF are exemplified for describing the present disclosure in specific terms; a different combination of the exemplified local levels or switching states can lead to the same or like result.

Furthermore, the separation of the functional blocks in the block diagrams is merely an example, and plural functional blocks may be implemented as a single functional block, a single functional block may be separated into plural functional blocks, or part of functions of a functional block may be transferred to another functional block. In addition, the functions of functional blocks having similar functions may be processed, in parallel or by time-division, by a single hardware or software product.

Moreover, the sequence in which the steps included in the visible light communication signal display method are executed is given as an example to describe the present disclosure in specific terms, and thus other sequences than the above are also possible. Furthermore, part of the steps may be executed simultaneously (in parallel) with another step.

Although the exemplary embodiments are described above, the Claims in this application are not limited to these embodiments. Those skilled in the art would readily appreciate that, without departing from the novel teachings and advantages of the subject matter recited in the appended Claims, various modifications may be made in the above-described embodiments and other embodiments may be obtained by arbitrarily combining structural elements in the above-described embodiments. Therefore, such modification examples and other embodiments are also included in the present disclosure.

INDUSTRIAL APPLICABILITY

The visible light communication signal display method and the display apparatus according to the present disclosure enable safe and active acquisition of information other than images and are, therefore, usable in various applications such as the transfer of image-attached information and information transmission in various scenes in a sense that such active properties allow necessary information to be safely obtained as much as needed from signage, information terminals, and information display devices outside, let alone devices such as televisions, personal computers, and tablets in homes.

We claim:

1. A visible light communication method, comprising:
obtaining a first information, by a receiver, through visible light communication with a light source;
sending the first information and a second information, by the receiver, to a first server, the second information including membership information of a specified organization that is stored in the receiver; and
obtaining, by the receiver, information from the first server using the first information and the second information,
wherein the visible light communication includes
setting an exposure time of an image sensor of the receiver so that, in an image obtained by capturing the light source by the image sensor, a bright line corresponding to each of the plurality of exposure lines included in the image sensor appears according to a change in luminance of the light source,
obtaining a bright line image including a plurality of bright lines, by capturing the light source that changes in luminance by the image sensor with the set exposure time, and
obtaining the first information of the light source, by demodulating data specified by a pattern of the plurality of bright lines included in the obtained bright line image.

2. The visible light communication method according to claim 1,
wherein the information is specified by the first information and the second information.

3. The visible light communication method according to claim 2,
wherein the second information is further related to a gender information of a user of the receiver, and the gender information is stored in the receiver.

4. The visible light communication method according to claim 3,
wherein the second information is further related to an age information of the user, and the age information is stored in the receiver.

5. The visible light communication method according to claim 1, further comprising:
sending the membership information to a second server; and
obtaining the second information from the second server, wherein the second information is specified by the membership information.

6. The visible light communication method according to claim 5,
wherein the first server and the second server are same.

7. A visible light communication apparatus, comprising:
a processor; and
a memory having thereon a program, the program causes the processor to execute operations including
obtaining a first information, by a receiver, through visible light communication with a light source;
sending the first information and a second information, by the receiver, to a first server, the second information including membership information of a specified organization that is stored in the receiver; and
obtaining, by the receiver, information from the first server using the first information and the second information,
wherein the visible light communication includes
setting an exposure time of an image sensor of the receiver so that, in an image obtained by capturing the light source by the image sensor, a bright line corresponding to each of the plurality of exposure lines included in the image sensor appears according to a change in luminance of the light source,
obtaining a bright line image including a plurality of bright lines, by capturing the light source that changes in luminance by the image sensor with the set exposure time, and
obtaining the first information of the light source, by demodulating data specified by a pattern of the plurality of bright lines included in the obtained bright line image.

8. A non-transitory, computer-readable recording medium storing an information communication program for performing visible light communication, the visible light communication program causing a computer to execute:
obtaining a first information, by a receiver, through the visible light communication with a light source;
sending the first information and a second information, by the receiver, to a first server, the second information including membership information of a specified organization that is stored in the receiver; and
obtaining, by the receiver, information from the first server using the first information and the second information,
wherein the visible light communication includes
setting an exposure time of an image sensor of the receiver so that, in an image obtained by capturing the light source by the image sensor, a bright line corresponding to each of the plurality of exposure lines included in the image sensor appears according to a change in luminance of the light source,
obtaining a bright line image including a plurality of bright lines, by capturing the light source that changes in luminance by the image sensor with the set exposure time, and
obtaining the first information of the light source, by demodulating data specified by a pattern of the plurality of bright lines included in the obtained bright line image.

* * * * *